US012561664B1

(12) United States Patent (10) Patent No.: US 12,561,664 B1
Wilson et al. (45) Date of Patent: Feb. 24, 2026

(54) ELECTRONIC AUDIBLE PAYMENT MESSAGING

(71) Applicant: Block, Inc., Oakland, CA (US)

(72) Inventors: Jesse Wilson, San Francisco, CA (US);
Terrill Dent, Waterloo (CA)

(73) Assignee: Block, Inc., Oakland, CA (US)

( * ) Notice: Subject to any disclaimer, the term of this
patent is extended or adjusted under 35
U.S.C. 154(b) by 0 days.

(21) Appl. No.: 18/421,853

(22) Filed: Jan. 24, 2024

Related U.S. Application Data

(63) Continuation of application No. 17/072,717, filed on
Oct. 16, 2020, now abandoned, which is a
(Continued)

(51) Int. Cl.
*G06Q 20/32* (2012.01)
*G06Q 20/22* (2012.01)
*G06Q 20/40* (2012.01)
*G06Q 30/06* (2023.01)
*G10L 15/08* (2006.01)
*H04L 51/02* (2022.01)

(52) U.S. Cl.
CPC ......... *G06Q 20/3255* (2013.01); *G06Q 20/22*
(2013.01); *G06Q 20/40* (2013.01); *G06Q*
*30/06* (2013.01); *G10L 15/083* (2013.01);
*H04L 51/02* (2013.01)

(58) Field of Classification Search
CPC .................................................. G06Q 20/3255
See application file for complete search history.

(56) References Cited

U.S. PATENT DOCUMENTS 8,332,314 B2    12/2012  Griffin
9,324,067 B2    4/2016   Van et al.
(Continued)

FOREIGN PATENT DOCUMENTS

WO        2017/103326 A1      6/2017

OTHER PUBLICATIONS

Austin, Patrick Lucas, "Apple Just Added One More Way to Repay
Your Friends", Jun. 5, 2017, Lifehacker, 3 pages.
(Continued)

*Primary Examiner* — Edward Chang
(74) *Attorney, Agent, or Firm* — Lee & Hayes, P.C.

(57) ABSTRACT

In one embodiment, a method includes receiving, at a
payment-service-system server, a payment request from a
voice-recognition server. The payment request includes a
sender identifier, a recipient identifier, and an amount and is
received by the payment-service-system server responsive
to the voice-recognition server identifying one or more
audible payment keywords in an encoded audio file received
from a user computing device. The method includes trans-
mitting, by the payment-service-system server, a confirma-
tion request to the user computing device to confirm the
payment request. The method includes receiving, at the
payment-service-system server, a confirmation of the pay-
ment request from the user computing device. The method
includes, upon receiving the confirmation of the payment
request, automatically debiting the amount from a sender
account associated with the sender identifier and crediting
the amount to a recipient account associated with the recipi-
ent identifier.

20 Claims, 9 Drawing Sheets

Related U.S. Application Data continuation of application No. 15/638,223, filed on Jun. 29, 2017, now Pat. No. 10,810,574.

(56) References Cited

U.S. PATENT DOCUMENTS

| | | | |
|---|---|---|---|
| 9,342,831 | B1 | 5/2016 | Davis et al. |
| 9,483,763 | B2 | 11/2016 | Van et al. |
| 9,917,802 | B2 | 3/2018 | Melzer et al. |
| 9,922,380 | B2 | 3/2018 | Isaacson et al. |
| 9,922,381 | B2 | 3/2018 | Isaacson et al. |
| 9,972,318 | B1 | 5/2018 | Kelly et al. |
| 9,992,335 | B2 | 6/2018 | Vijaywargi et al. |
| 10,235,129 | B1 | 3/2019 | Carlson et al. |
| 10,423,948 | B1 | 9/2019 | Wilson et al. |
| 10,810,574 | B1 | 10/2020 | Wilson et al. |
| 2005/0131813 | A1 | 6/2005 | Gallagher et al. |
| 2007/0011104 | A1 | 1/2007 | Leger et al. |
| 2008/0177659 | A1 | 7/2008 | Lacey et al. |
| 2009/0094458 | A1 | 4/2009 | Dionisio |
| 2010/0114775 | A1 | 5/2010 | Griffin |
| 2010/0250687 | A1 | 9/2010 | Smith et al. |
| 2010/0312645 | A1 | 12/2010 | Niejadlik et al. |
| 2012/0158589 | A1 | 6/2012 | Katzin et al. |
| 2012/0310752 | A1 | 12/2012 | Gaddis |
| 2013/0018779 | A1 | 1/2013 | Laquerre et al. |
| 2013/0204993 | A1 | 8/2013 | Uribe-Etxebarria |
| 2014/0052633 | A1 | 2/2014 | Gandhi |
| 2014/0058939 | A1 | 2/2014 | Savla |
| 2014/0337207 | A1 | 11/2014 | Zhang et al. |
| 2015/0046329 | A1 | 2/2015 | Huxham et al. |
| 2015/0088998 | A1 | 3/2015 | Isensee et al. |
| 2015/0095188 | A1 | 4/2015 | Lee et al. |
| 2015/0127526 | A1 | 5/2015 | Ye et al. |
| 2015/0269575 | A1 | 9/2015 | Narayanan et al. |
| 2015/0348002 | A1 | 12/2015 | Van et al. |
| 2015/0371223 | A1 | 12/2015 | Li et al. |
| 2016/0117651 | A1 | 4/2016 | Davis |
| 2016/0117665 | A1 | 4/2016 | Davis |
| 2016/0117666 | A1 | 4/2016 | Davis et al. |
| 2016/0117670 | A1 | 4/2016 | Davis |
| 2016/0125371 | A1* | 5/2016 | Grassadonia ........ G06Q 20/405 705/44 |
| 2016/0171481 | A1 | 6/2016 | Mcelmurry et al. |
| 2016/0180316 | A1* | 6/2016 | Wang .................. G06Q 20/384 705/39 |
| 2016/0180325 | A1 | 6/2016 | Davis et al. |
| 2016/0224967 | A1 | 8/2016 | Davis et al. |
| 2016/0283936 | A1 | 9/2016 | Daniel et al. |
| 2016/0335532 | A1 | 11/2016 | Sanghavi et al. |
| 2016/0360039 | A1 | 12/2016 | Sanghavi et al. |
| 2017/0004588 | A1 | 1/2017 | Isaacson et al. |
| 2017/0011383 | A1 | 1/2017 | Melzer |
| 2017/0186115 | A1 | 6/2017 | Sheppard et al. |
| 2017/0262837 | A1* | 9/2017 | Gosalia .................. H04W 4/14 |
| 2017/0270605 | A1 | 9/2017 | Demark et al. |
| 2017/0374198 | A1 | 12/2017 | De et al. |

OTHER PUBLICATIONS

Barbosa, Greg, "Square Cash update includes promised Messages app plus Siri integration", Sep. 13, 2016, 9to5 Mac, 3 pages.

BBVA Bank, "The latest from Apple and Google in mobile APIs for developing native applications", Nov. 10, 2016, BBVA Bank News, 9 pages.

BI Intelligence—Finance, "Facebook Messenger Promotes P2P Payments", Sep. 23, 2016, Business Insider, 4 pages.

Chowdhry, Amit, "Apple Patent Highlights An iMessage Payment Service", Jan. 7, 2016, Forbes Tech, 3 pages.

Constine, Josh, "Facebook Introduces Free Friend-To-Friend Payments Through Messages", Mar. 17, 2015, TechCrunch, 5 pages.

Constine, Josh, "Facebook Messenger Adds Group Chat Polls and AI Payment Suggestions", Sep. 22, 2016, TechCrunch, 3 pages.

Crook, Jordan, "Apple launches iMessage Apps so third-party devs can join your convos", Jun. 13, 2016, TechCrunch, 2 pages.

Fuhrmeister, Chris, "Apple Wants to Help You Split the Check With iMessage", Jun. 15, 2016, Eater, 2 pages.

Goel, Vindu, "Apple to Offer App Developers Access to Siri and iMessage", Jun. 13, 2016, The New York Times (Year: 2016), 2 pages.

Madore, P. H., "Apple Patent Reveals Siri-Assisted iMessage P2P Payments Platform", Nov. 17, 2016, Hacked: Hacking Finance, Artificial Intelligence, 5 pages.

Peckham, James, "Apple is opening up Siri, iMessage and Maps—here's why that's a great thing", Jun. 13, 2016, Tech Radar, 4 pages.

Quoc, Michael, "11 Examples of Conversational Commerce and Chatbots", May 31, 2016, Chatbots Magazine by Octane AI, 24 pages.

Rao, Leena, "Square Cash Users Will Be Able to Send Money Via Apple iMessage", Jun. 13, 2016, Fortune, 6 pages.

Statt, Nick, "Facebook's AI Assistant Will Now Offer Suggestions Inside Messenger", Apr. 6, 2017, The Verge, 5 pages.

Tepper, Fitz, "You Can Now Send Your Friends Money Inside iMessage", Jun. 5, 2017, TechCrunch, 3 pages.

Wagner, Kurt, "Facebook Messenger Adds Peer-to-Peer Payments Feature", Mar. 17, 2015, Recode, 3 pages.

Yeung, Ken, "Facebook Adds Group Payments to Messenger", Apr. 11, 2017, VentureBeat, 3 pages.

Yeung, Ken, "Facebook Messenger Gets Polls and Now Encourages Peer-to-Peer Payments", Sep. 22, 2016, Venture Beat, 5 pages.

* cited by examiner

100

ELECTRONIC AUDIBLE PAYMENT MESSAGING

PRIORITY

This application is a continuation under 35 U.S.C. § 120 of U.S. patent application Ser. No. 17/072,717, filed on Oct. 16, 2020, which is a continuation of U.S. patent application Ser. No. 15/638,223, now U.S. Pat. No. 10,810,457, filed 29 Jun. 2017.

BACKGROUND

Chatbots can be a computer program executed by a computer server or other computerized device that can conduct an auditory or textual conversation with a user and can simulate how a human may behave. Currently, chatbots can generate rudimentary responses to basic one-on-one questions, such as, "Who was the 16th president?" The chatbot can respond with "Abraham Lincoln" and other biographical information, such as date and place of birth. Such chatbots have begun adding information in conversations. For example, a user might receive a photo of a butterfly, and the chatbot might suggest appropriate responses, such as, beautiful, pretty, or nice picture. A chatbot can make restaurant recommendations if it detects a conversation about food. For example, if a conversation contains the string "Italian food," then the chatbot can insert restaurant recommendations, reviews, and maps to help the users identify a restaurant. Many chatbots, however, often work only on specific, proprietary applications and do not have features that users desire. Messaging applications, such as Facebook Messenger, Slack, and Google Allo, may use chatbots for limited purposes, such as responding to basic questions. But these chatbots have not been capable of initiating a payment within a conversation using the messaging application.

DESCRIPTION OF THE DRAWINGS

Non-limiting embodiments of the present disclosure are described by way of example with reference to the accompanying figures which are schematic and are not intended to be drawn to scale. Unless indicated as representing the background art, the figures represent aspects of the disclosure.

DESCRIPTION

Figure 1:
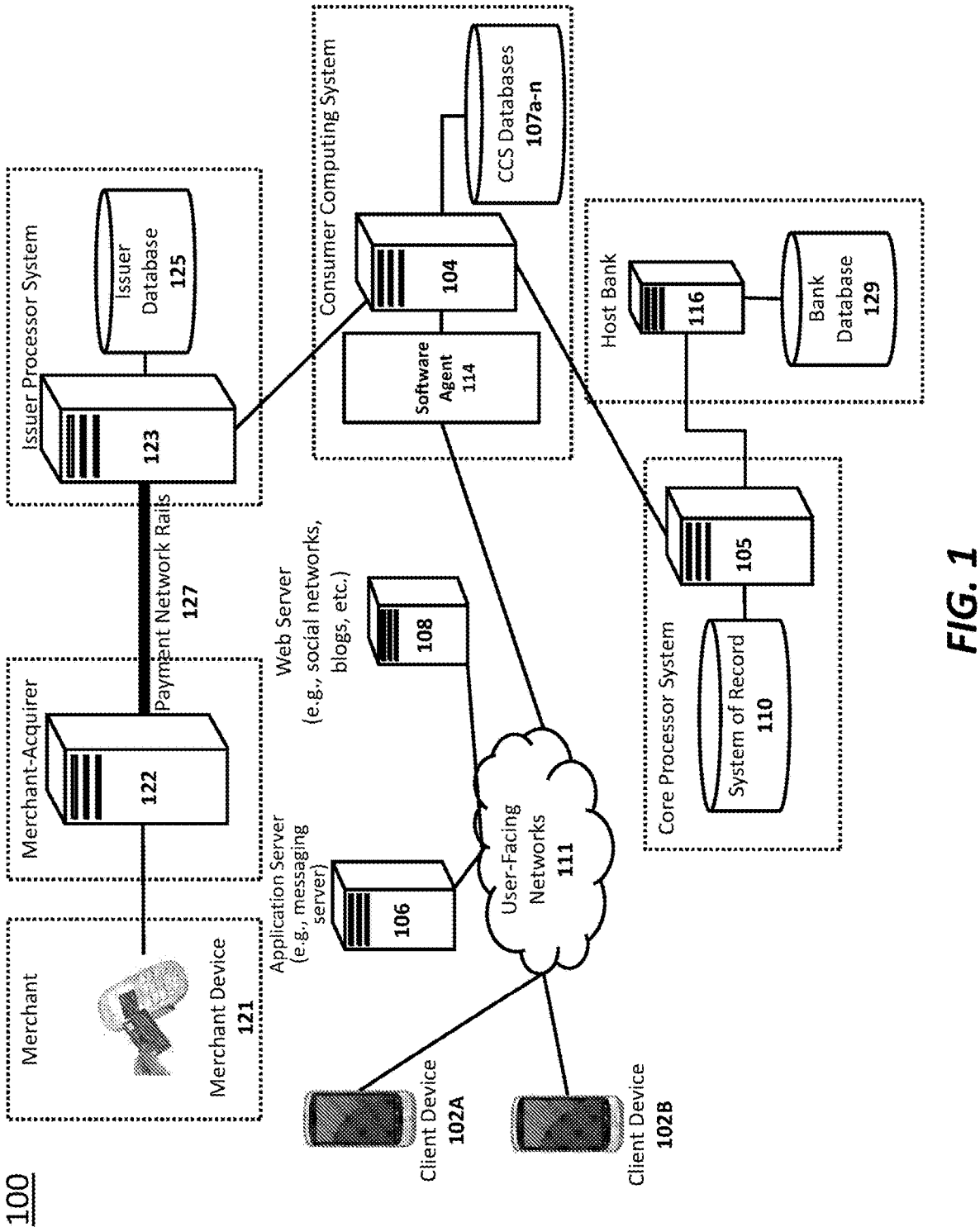
FIG. 1 illustrates an example system for third-party participation in a messaging application, according to an embodiment.

The present disclosure is here described in detail with reference to embodiments illustrated in the drawings, which form a part here. Other embodiments may be used or other changes may be made without departing from the spirit or scope of the present disclosure. The illustrative embodiments described in the detailed description are not meant to be limiting of the subject matter presented here.

Embodiments of this disclosure include technical solutions to add functionality to chatbots, including automatically detecting requests to make payment transactions, and suggesting payment transactions. A payment-service-system server can detect requests to make payment transactions using natural language processing to detect requests to make payment transactions in human-readable or computer-readable messages. The payment transactions can be processed by a third-party payment application that communicates with at least two other users in a messaging application. The third-party payment application can generate messages to the messaging applications using the same protocol that other users can generate messages.

These technical solutions include enhancing third-party messaging platforms that do not have its own payment service to include real-time, automated, streamlined peer-to-peer payments using a chatbot. The technical solution includes communicating with users using either human-readable or machine-readable messages to suggest or process peer-to-peer payments on the third-party messaging platforms. Advantages to using a chatbot vs. an API to process payment include ease of us, fewer resources needed, faster implementation and response, and more accurate communication.

The figures and disclosure below provide example implementations technical solutions of messaging platforms interfacing with a chatbot to suggest or process peer-to-peer payments.

FIG. 1 illustrates an example system 100 for providing automated third-party messaging. The embodiments illustrated in FIG. 1 include a client device 102, a server 108 of a third-party web content provider, a computer server system of a third-party application service ("application server 106"), and a payment-service-system 113, all of which are remote from each other and in communication over a user-facing network 111. In some embodiments, payment-service-system 113 includes one or more servers 104 and a software agent 114. The one or more servers 104 are typically equipped with, or are coupled to, one or more databases 107a-107n, which can include one or more hard drives, a centralized or distributed data cluster, a cloud-storage service provider, or other suitable storage systems suitable for storing digital data. Items 104, 107a-107n, 111, 113, and 114, can be similar to those components illustrated in FIG. 1.

The network 111 can include any combination of local area and/or wide area networks, using both wired and wireless communication systems. In some embodiments, the network 111 uses standard communications technologies and/or protocols. Thus, the network 111 can include links using technologies such as Ethernet, 802.11, worldwide interoperability for microwave access (WiMax), 3G, 4G, CDMA, digital subscriber line (DSL), etc. Similarly, the networking protocols used on the network 111 may include multiprotocol label switching (MPLS), transmission control protocol/Internet protocol (TCP/IP), hypertext transport protocol (HTTP), and/or file transfer protocol (FTP). Data exchanged over the network 111 can be represented using technologies and/or formats including hypertext markup language (HTML) or extensible markup language (XML). In addition, all or some links can be encrypted using encryption technologies such as secure sockets layer (SSL), transport layer security (TLS), and Internet Protocol security (IPsec).

In other embodiments, the environment can have more or fewer components than shown, or a different configuration of components. The various components shown in FIG. 1 can be implemented by using hardware, software, firmware or a combination thereof, including one or more signal processing and/or application specific integrated circuits. Further, the environment of FIG. 1 can be implemented based on other architectures in other embodiments. For example, in some embodiments, the software agent 114 can exist separately from the payment-service-system 113, e.g., as part of the server 104, or as a standalone server (e.g., a standalone API server in communication with the server 104, the application server 106, and the servers 104). In another example, in some embodiments, functions of at least some of the servers can be consolidated. The system 100 also includes components to handle point-of-sale transactions. First, however, this disclosure focuses on transactions between the two client devices 102A and 102B.

The client device 102 can be any processing device capable of receiving user input as well as transmitting and/or receiving data via the network 111 by using a transceiver, e.g., one or more input/output devices for communicating over network 111, such as an Ethernet or WiFi adapter. In some embodiments, the client device 102 can be a computer system (e.g., a desktop 102A or a laptop computer 102B) or a mobile device having computer functionality (e.g., a tablet device, a smartphone, or a mobile phone). The client device 102 typically includes a display that can be used to display a user interface, and may include suitable input devices (not shown for simplicity) such as a touchscreen, a keyboard, a mouse, or a touchpad. In some embodiments, the display may be a touch-sensitive screen that includes input functionalities.

The client device 102 can be configured to communicate via the network 111 with the server 104 and/or the application server 106. In some embodiments, the client device 102 can retrieve or send information to the server 104 and/or the application server 106, and run one or more applications, such as a software agent program, with customized content retrieved from the server 104 or the application server 106. For example, the client device 102 can execute a browser application to enable communication between the client device 102 and the server 104 (e.g., to access a social networking website). In another example, the client device 102 can execute a customized client to enable communication between the client device 102 and the application server 106. For example, the customized client is a messaging application operated by a messaging-service server. The customized client can further provide a channel of communication between respective client devices of a sender 140 and a recipient 142 (e.g., a channel that enables transmission of one or more electronic messages including, e.g., text, audio, and/or video). For example, the customized client enables an instant exchange of electronic messages between the respective client devices. Other example messaging applications and/or messaging-service servers can include an email application and email server or a social networking messaging application and a social networking server.

In accordance with various implementations of payment proxies, the sender 140 can utilize a given client device 102 to trigger a money transfer to a recipient 142. For example, by accessing a landing page with the client device 102, the sender 140 can submit an amount of money to the recipient 142 that is associated with the landing page. In another example, the sender 140, using the client device 102, can transmit a message to the recipient (e.g., via a chat application or a forum), where that message includes an indication of an intent of the sender 140 to send money to the recipient through use of a specified syntax for one or more inputs in that message. The recipient 142 can similarly use another given client device 102 to receive the money, for example, by interacting with a confirmation link sent to the client device of the recipient 142 as a result of the money transfer triggered by the sender 140.

In an alternative embodiment, sender 140 can have an account maintained at the server 104, which can host a website that includes one or more graphical user interfaces (GUis) for organizing and presenting content to users. For example, through the system website, users create account logins to connect to their social identities (e.g., social profiles or social accounts or shopping accounts), read content (e.g., messages, comments, posts), create or post content, communicate in real-time with other users (e.g., chat, post messages, comment on posts, etc.), and/or otherwise engage or interact with other users of the system website (e.g., "friends," "followers," "social contacts," or other types of social network connections). In some embodiments, the user interactions on the system website lead to internal API communication, which involves the server 104 monitoring the user interactions for an indication of an intent to transfer money, e.g., by parsing messages at the system website. In response to such indications, the server 104 can transmit one or more requests (e.g., POST or GET requests) to query the database(s) 107a-107n. The server 104 can determine the indication of the intent based on an identification of a user input, e.g., a string of characters, that has a particular syntax, the syntax being a monetary indicator preceding one or more alphanumeric characters. The user input having the syntax operates as a trigger to send money to a particular recipient (e.g., recipient 142). The recipient can be identified based on a user input with the syntax (e.g., payment proxy represented by the user input), or based on a user account of a user currently accessing the system website (e.g., login credentials).

In one example, the server 108 monitors user messages on the system website for any particular message that includes a user input having the syntax of the monetary indicator preceding the alphanumeric characters, and forwards a request to the software agent 114. In such an example, the server 104 can identify the syntax by parsing the user messages to find, for example, a message that includes the syntax, and further parses that message to identify a payment amount and a payment proxy, and forwards such information to the software agent 114 and/or the server 104 to process the money transfer. The syntax can either be in human-readable form and identified using natural language processing, or in a computer-readable form and identified using special characters. Human-readable form is natural or ordinary language that occurs naturally between humans without a planned syntax. The computer-readable syntax is planned and unnatural, and can include an opcode followed by one or more operands, e.g., /Cash [recipient] [amount] [reason (optional)]. In some embodiments, the server 104 parses the user messages simply to identify any message with input(s) having the syntax, and forwards that message to the server 104 via the software agent 114. In such embodiments, the server 104 can receive the message and can parse it for a payment proxy (e.g., one or more alphabetic characters of the user input having the syntax) to identify a recipient associated with the payment proxy. In other embodiments, the recipient and sender can be identified by unique identifiers, such as usernames or phone numbers. Upon identifying the recipient, the server 104 can identify an associated recipient financial account or sub-account based on the identifier or payment proxy, and initiate a money transfer to that recipient financial account. In some embodiments, the software agent 114 (e.g., instructed by the server 104) can also send back, in a response to the server 104, appropriate data for display to the user. For example, the data can be an HTML string that displays a confirmation message with a link for prompting the sender to confirm his/her intent to transfer money to the recipient associated with the payment proxy. In some embodiments, the server 104 sends a confirmation message to the sender using information included in the request received from the server 104, e.g., an identifier associated with the sender. For example, the identifier can be an email address of the user, and the server 104 (e.g., via an email server) sends an email message to the user's email address.

The server 104 can identify potential payment requests in the background, while the users conduct a conversation. The users do not need to make any specific request or take any action for the server 104 to identify potential payment requests. The users may continue to use the messaging application in the foreground, while the server 104 operates in the background to identify potential payment requests and communicate with the users. In some embodiments, payment requests can only be made between participants of the conversation, and the software agent program will not process a payment request to a user who is not a participant of the conversation. Upon detecting or identifying language that appears to be a payment request, the software agent program will not generate a payment command when at least one recipient of the payment is not a participant of the conversation in the messaging application at the time of the payment request. In other embodiments, the server 104 can process payment between a participant of the conversation and a party that is not a participant.

The messaging-service server 106 supports an application that includes one or more graphical user interfaces for organizing and presenting content to users. The messaging-service server 106 can be a mobile application installed on a mobile device or a software application installed on a personal computer. Users can utilize the messaging-service server 106 to interact with other users. The messaging-service server 106 can be a messaging application. For example, through the messaging-service server 106, users create account logins to connect to their social identities (e.g., social profiles or social accounts or shopping) to communicate with other social identities, read messages, create or post messages, communicate in real-time with other users (e.g., chat), and/or otherwise engage or interact with other users of the messaging-service server 106 (e.g., "friends," "social contacts," or other types of social network connections). In some embodiments, the user interactions on the system website lead to internal API communication, which involves the application server 106 monitoring the messages for an indication of an intent to transfer money, e.g., by parsing messages at the messaging-service server 106. In response to such indications, the application server 106 can transmit one or more requests (e.g., POST or GET requests) to the software agent 114 of the server(s) 104 to query the database(s) 107a-107n, and display the data returned by the software agent 114 of the server(s) 104 as appropriate. In some embodiments, the messaging-service server 106 performs the parsing. Upon identifying the syntax, the messaging-service server 106 can notify the application server 106 of the indication of the intent to transfer money. Alternatively, in some embodiments, the messaging-service server 106 notifies a payment service application executing on the user's device of the indication, where that payment service application communicates with the servers 104 via the software agent 114.

In one example, the messaging-service server 106 monitors at the user device (e.g., client device 102 of the sender 140) for any particular message that includes a user input that has the syntax of the monetary indicator preceding the alphanumeric characters. Upon identifying such a message, the messaging-service server transmits a request to the software agent 114 that includes, e.g., the message and an identifier associated with a creator of the message (e.g., an email address or phone number), for the software agent 114 and/or the server 104 to process the money transfer. In such an example, the server 104 can parse the message for a payment proxy (e.g., the user input having the syntax) to identify a recipient associated with the payment proxy. Upon identifying the recipient and an associated recipient financial account, the server 104 initiates a money transfer to that recipient. In some embodiments, the messaging-service server 106 communicates with a payment service application executing at the user's device via message to software agent 114. The payment service application can then further parse the identified message having the syntax to identify an amount of money for the transfer and a recipient for the transfer (e.g., payment proxy). The payment service application can communicate this information to the server 104 (e.g., via the software agent 114), which processes the money transfer based on this information. In some embodiments, the payment service application forwards the message to the server 104, which performs the additional parsing to identify the amount of money and the recipient.

In some embodiments, the software agent 114 (e.g., instructed by the server 104) can also send back appropriate data relating to the money transfer for display to the user at the messaging-service server 106. For example, the data includes text that can be incorporated in, e.g., a push notification, that displays a confirmation message with an action link for the user to confirm his/her intent to transfer money to the recipient associated with the payment proxy. In some embodiments, the server 104 sends a confirmation message to the user using information included in the request received from the application server 106, e.g., an identifier associated with the user. For example, the identifier can be a telephone number of the user, and the server 104 sends a text message to the user's phone number.

The payment-service-system 113 can be a cloud computing environment, a virtualized computing environment, a computer cluster, or any combination thereof. The payment-service-system 113 includes a payment processor (not shown) configured to process money transfers conducted between a sender and a recipient identified by a payment proxy. As discussed briefly above, the payment-service-system 113 includes the one or more servers 104. The payment processor can be a part of the one or more servers 104, and can work in coordination with the software agent 114 to exchange requests and responses with the server 104, the application server 106, and/or the payment service application associated with the payment-service-system 113 to process one or more transactions triggered by use of the syntax (e.g., money transfers). The one or more servers 104 can handle secure transactions (e.g., using a secure server), to process all payment transactions triggered.

In general, the servers 104 store secure information such as credit card numbers, debit card numbers, bank account numbers, user accounts stored in one of databases 107a-107n, e.g., payment proxies associated with users, user identifying or profile information, financial account information, or other sensitive information. Each user account can be associated with one or more card accounts of the user, e.g., debit or credit card accounts. A card account can be a financial account managed by a card issuer (e.g., a card issuer 132) and can be associated with the card number. In some embodiments, the one or more card accounts are stored at the server 104 (e.g., at the databases 107a-107n). Generally, the card issuer issues a physical payment card for each card account.

In some embodiments, the payment-service-system 113 includes a payment service application server (e.g., a server of the servers 104) that supports a payment application for executing various services provided by the payment-service-system 113. The payment service application includes one or more graphical user interfaces for presenting content and processing user requests. The payment service application can be a mobile application (e.g., "mobile payment application") installed on a mobile device or a software application installed on a personal computer. For example, through the payment service application, users create account logins to utilize financial services offered by the payment-service-system 113, to link their financial accounts with the payment-service-system 113 (e.g., registration with the payment-service-system 113), to transfer money using their user accounts and/or financial accounts, and/or otherwise engage with the services offered by the payment-service-system 113 via the payment service application.

To process payment transactions, the payment-service-system 113 can communicate with one or more financial networks. In some embodiments, the payment-service-system 113 can communicate with a computer system of a card payment network 120, e.g., a debit card payment network (e.g., STAR or PULSE) or a credit card payment network (e.g., Visa® or MasterCard®), (collectively, "card payment network 120"). In some embodiments, the payment-service-system 113 can communicate with the card payment network 120 over the same user-facing network 111, or a different network. In one example, the card payment network 120 can communicate, in turn, with the computer system of a sender card issuer 122, e.g., a bank, and a computer system of a recipient card issuer 124, e.g., a same or different bank. The sender card issuer 122 and the recipient card issuer 124 can transfer money, e.g., over a debit payment network, in response to a request to transfer money from the payment-service-system 113.

In some embodiments, the payment-service-system 113 can communicate with a computer system of an ACH network 130. The computer system of the ACH network 130 can communicate with a sender card issuer 132 and a recipient bank account 134. The sender card issuer 132 and the recipient bank account 134 can transfer money, e.g., using the ACH network, in response to a request to transfer money from the payment-service-system 113. In other embodiments, there can also be computer systems of other entities, e.g. the card acquirer, between the payment-servicesystem 113 and the card issuers, and between the payment-service-system 113 and the bank accounts.

In some embodiments, the payment-service-system 113 can transfer money between bank 116 and one or more of the recipient accounts on card payment network 120 and ACH network 130. The transfer of funds occurs similar to that illustrated in FIG. 3. In a first direction, a sender having an account at bank 116 can initiate a payment transaction to a recipient with an account over the card payment network 120 or the ACH network 130. The sender's account would be debited according to FIG. 3; however, the recipient's account would be credited in accordance with the processes associated with the respective networks. In the other direction, a sender with an account on card payment network 120 or ACH network 130 can begin a payment transaction by sending money to a recipient with an account at bank 116. System or record 105 can maintain the account in database 110. The sender would send the funds using the protocols associated with either card payment network 120 or ACH network 130, whereas the recipient would receive the funds in accordance with FIG. 3. In this way, server 104 can coordinate transactions between account holders having several different types of accounts.

In accordance with various embodiments, a payment transaction (e.g., a transferring of money) can originate at a device of the sender 140 ("sender device"), such as the desktop 102A. For example, the sender 140 can initiate a payment transaction by using the sender device to access and/or interact on a forum, such as a microblog hosted by the server 104. Alternatively, the sender 140 can initiate, for example, the payment transaction by using the sender device to access a landing page that is associated with a personalized URL, which incorporates a payment proxy of the recipient 142. In another example, the sender 140 can initiate a payment transaction by using a sender device to access an application such as a messaging application supported by the application server 106. In yet another example, a user can initiate a payment transaction by using a sender device to access an application such as the payment service application supported by the payment-service-system 113.

The payment-service-system 113 can process the payment transaction on behalf of the user. Processing the payment transaction involves identifying a financial account of a sender user and a financial account of a recipient user (e.g., by accessing the databases 107a-107n of the payment-service-system 113), and transferring funds between the accounts.

In accordance with various embodiments of the disclosed technology, the financial account of the recipient user can be identified based on a payment proxy associated with the recipient user. For example, the recipient user may have previously created a payment proxy (e.g., $redcross) to be used with a service provided by the payment-service-system 113 (e.g., a money transfer service), and entered financial account information through a GUI (e.g., an interactive payment receiving interface) of the payment service application of the payment-service-system 113. In this example, the payment-service-system 113, in turn, associates the financial account information with the recipient user's newly created payment proxy in this registration process. In other words, upon submission of information by the recipient user, the payment-service-system 113 automatically registers the financial account and the payment proxy with the payment-service-system 113 on behalf of the recipient user. The recipient user can submit financial account information for one or more financial accounts. Associations of the one or more financial accounts with the recipient user's payment proxy can be stored on the payment-service-system 113 (e.g., databases 107a-107n). Information of the financial accounts can be used for future payment transactions (e.g., money transfers).

In accordance with various embodiments of the disclosed technology, the financial account of the sender user can be identified based on identifier associated with the sender user ("sender identifier"). In some embodiments, the payment-service-system 113 can receive the sender identifier from the server 104 or the application server 106. In some embodiments, the payment-service-system 113 receives the sender identifier from the payment service application supported by the payment-service-system 113.

The payment-service-system 113 can identify a financial account of the sender user based on an association between that financial account and the sender identifier. For example, the sender user may have previously received payment (e.g., from another sender user) and entered financial account information through a GUI of the payment service application of the payment-service-system 113 (e.g., an interactive payment receiving interface). In such an example, the payment-service-system 113 may have identified the sender identifier of the sender user (e.g., via email sent to the sender user or text message). In turn, the payment-service-system 113 stores the financial account information in association with the sender identifier newly created by virtue of accepting the payment from the other sender user (using the service provided by the payment-service-system 113). The sender user can submit financial account information for one or more financial accounts. Associations of the one or more financial accounts with the sender identifier can be stored on the payment-service-system 113 (e.g., databases 107a-107n). Information of these financial accounts can be used for future payment transactions (e.g., money transfers).

If no financial account information is identified for either the sender user or the recipient user, the payment-service-system 113 can send a message (e.g., a financial account request message) to the respective user requesting that financial account information to be submitted. The message can be a confirmation message that includes a secure link to enter the financial account information, such as a debit card number or a credit card number and associated authentication information (e.g., expire date, ZIP Code, PIN number, or security code). For example, the respective user can simply input financial account information, such as a debit card number or a credit card number.

When the financial account information is identified for both the sender user and the recipient user (either initially or later submitted through the confirmation message), the payment-service-system 113 sends a request to transfer money, e.g. via the card payment network 120, the ACH network 130, or the bank 116. In particular, to transfer money between the sender user and the recipient user (identified based on the payment proxy), the payment-service-system 113 can operate as a gateway or a middleman.

To operate as a gateway, the payment-service-system 113 can identify debit card accounts, e.g. stored at the servers 104, for both the sender user and the recipient user. The payment-service-system 113 can submit a request to an appropriate card issuer e.g., to the sender user's card issuer or to the receiving user's card issuer, to transfer money. For example, the request can be sent over debit rails. That is, a debit card network can receive the request and can carry out the request to transfer money. The appropriate card issuer can receive and process the request by transferring money to the appropriate card account.

To operate as a middleman, the payment-service-system 113 can receive a payment amount by processing a payment card, e.g., a credit card or a debit card, of the user sender and hold the payment amount. The payment-service-system 113 can push the payment amount, e.g., over debit rails, to a debit account of the recipient user. Instead of holding the payment amount, the payment-service-system 113 can also forward the payment once the recipient user links the account with the payment-service-system 113. Alternatively, the payment-service-system 113 can generate a transaction ACH that debits an amount from the sender bank account and can credit the amount into a recipient bank account, e.g., using ACH, or onto a debit account, e.g., over debit rails, of the recipient user. Alternatively, the payment-service-system 113 can generate a transaction to a transaction record of a system of system of record 105 to either debit or credit an account stored at bank 116, according to a corresponding transaction over either card payment network 120 or ACH network 130.

In an embodiment in which the application server 106 acts as a messaging server with a messaging-service application, a plurality of client devices 102 can communicate over network 111 with the application server 106. Similarly, the software agent 114 can allow for the server 104 to communicate with application server 106 over network 111. In this way, the plurality of client devices 102 and the server 104 can each communicate via the messaging application on the application server.

System 100 further includes several servers that handle vanous steps m a computerized system for processing point-of-sale transactions and for tracking debit and credit transactions to add additional functionality to automated third-party messaging. The example system 100 may comprise a plurality of entity systems associated and operated by various entities of the system 100, including a merchant, merchant-acquirer, issuer processor, payment-service-system, host banking system working in collaboration with the payment-service-system to provide user-oriented services, and core processor system. Each of the example entity systems may comprise any number of electronic devices (e.g., merchant computing devices 121, server computers 122, 123, 104, 105, 106) that execute the various processes described herein and networking devices that facilitate intercommunications between the various entities. Embodiments may comprise additional or alternative entity systems; and that some embodiment may omit or combine certain entity systems of the example system 100 shown in FIG. 1.

Merchant Computing Device

A merchant computing device 121 may be employed by a merchant to request payment authorization for a particular transaction. The merchant computing device 121 may be any device capable of capturing payment request data from various types of payment instruments, and then transmitting payment authorization requests containing the request data to various components of a system 100. Non-limiting examples of a merchant computing device 121 may include a point of sale (POS) terminal, a credit card payment processing terminal (e.g., a credit card scanner), and a cash register. Non-limiting examples of payment instruments may include magnetic stripe cards, EMV cards, and virtual cards that may be stored on client device(s) 102A and 102B. As mentioned, the merchant computing device 121 may comprise or may be coupled to various types of instrument readers configured to capture transaction data from certain types of payment instruments. For instance, if the payment instrument is a virtual card stored on client device(s) 102A and 102B, and the client device(s) 102A and 102B is configured to transmit payment request data for the virtual card using near field communications (NFC), then the merchant computing device 121 may comprise or may be coupled to an NFC scanner configured to capture the transaction data related to the virtual card via the NFC signal received from the client device(s) 102A and 102B.

In operation, a merchant computing device 121 may capture payment transaction data, such as a card identifier (CID) or card number, and then transmit the payment transaction data to a merchant-acquirer server 122. The merchant computing device 121 may be configured to generate digital messages containing the payment authorization request and transaction data, which, in some embodiments, may be generated according to particular protocols or specifications. For example, the merchant computing device 121 may generate a payment authorization request according to one or more ISO standards in which the payment authorization request contains certain fields of payment transaction data. Non-limiting examples of data fields that may be included the digital message may include a merchant identifier (merchant ID), a merchant category code (MCC), an amount for the transaction, a timestamp (e.g., data, time), and a card number. In some implementations, the merchant computing device 121 may transmit the digital message to containing the card and/or other payment information to a merchant-acquirer server 122, although in some implementations, the digital message may be transmitted to other devices, such as an issuer processor server 123 of an issuer processor system.

The merchant computing device 121 can communicate with the payment-service-system server 104 to handle many forms of merchant-related computing needs, including process payments, track inventory, transfer funds, purchase inventory, receive software updates, transfer purchase- and user-related data, and make special offers. The merchant computing device 121 can be a proprietary device or run proprietary software associated with the payment-service-system server 104. By having access to such data from the merchant computing device 121 and from the client device(s) 102A and 102B, the payment-service-system server 104 has much more visibility into the payment process than prior art systems, which only have visibility on one side of a transaction, i.e., the merchant or the customer. In some embodiments, the payment-service-system server 104 communicates with and has data from both the merchant and the client.

Merchant-Acquirer

Merchant-acquirers may be financial institutions that process credit or debit card payments on behalf of a merchant. A merchant-acquirer may be configured to receive payments from banks that issue payment cards within a payment network entity (also referred to as a payment network association entity); examples of payment network entities may include Visa®, MasterCard®, Discover®, and American Express®. A merchant-acquirer server 122 may be any computing device configured to communicate, over predetermined payment network rails 127, digital messages containing payment transaction data to and from one or more merchant computing devices 121, as well as transaction data to and from the issuer processor server 123. In operation, the merchant-acquirer server 122 may perform one or more processes on the digital message, and forward at least some of the payment transaction data collected by the merchant computing device 121 to the issuer processor server 123 over the payment network rails 127 of a particular payment network entity (e.g., Visa® or MasterCard® networks). In some implementations, the merchant-acquirer server 122 may forward to the merchant computing device 121 payment authorization response messages from the issuer processor server 123, indicating whether the payment was authorized or declined.

In operation, the merchant computing device 121 may capture payment card information and then generate and transmit a digital message, such as a payment authorization request, comprising the payment card information along with transaction data (e.g., transaction amount, merchant identifier) to a merchant-acquirer server 122. The merchant computing device 121 may be configured to generate digital messages containing the payment authorization request, which includes the payment card information and transaction data, may be generated according to particular protocols or specifications, e.g., one or more ISO standards in which the payment authorization request can contain certain fields for the payment card information and the transaction data. Non-limiting examples of data fields that may be included the digital message may include a merchant identifier (merchant ID), a merchant name, a merchant category code (MCC), an amount for the transaction, a timestamp (e.g., data, time), and a card number. In some implementations, the merchant computing device 121 may transmit the digital message containing the card and/or other payment information to a merchant-acquirer server 122, although in some embodiments, the digital message may be transmitted to other devices, such as an issuer processor server 123 of an issuer processor system.

Payment Network Association and Payment Network Rails

Payment network entities (e.g., Visa®, MasterCard®, American Express®) may be entities that operate payment network rails 127, which may be a computing communications network configured to receive and transmit digital messages between and among merchant computing devices 121 and merchant-acquirer servers 122, as well as messages between merchant-acquirer servers 122 and issuer processor server 123. In operation, merchant computing devices 121 and merchant-acquirer servers 122 may generate, manipulate, and transmit digital messages containing payment transaction request messages and payment transaction data. The digital messages may be generated and manipulated according to the policies, standards, and protocols implemented by each particular payment network.

Issuer Processor

Issuer processor systems can establish payment card number records for customers, issue bills and statements, and process payments. The issuer processor server 123 can perform these functions and store transactions and payment card numbers in a storage device, such as an issuer database 125. Issuer processors will typically forward payment authorization requests to a core processor server 105. However, the example system comprises a payment-service-system server 104 positioned between issuer processor server 123 and core processor server 105. Furthermore, the payment-service-system server 104 can perform some or all of the functions typically associated with issuer processors, and therefore, in these embodiments, the merchant-acquirer server 122 can communicate over the payment network rails with the payment-service-system server 104. Although the issuer processor server 123 and the payment-service-system server 104 are shown as separate computing platforms, the issuer processor server 123 and the payment-service-system server 104 can be implemented as a single platform. The positioning of the payment-service-system server 104 between issuer processor server 123 and core processor server 105 allows the payment-service-system server 104 to provide added functionality to the system, such as intervene in and record transactions in the payment stream (e.g., intercept payment authorizations). As a result, the payment-service-system server 104 can also have access to all transactions associated with an account to provide further services to the client device(s) 102A and 102B associated with the account.

In some embodiments, the issuer processor server 123 may be configured to generate a cryptogram token for a payment card number, according to various predetermined algorithms and requirements associated with a digital wallet application executed by client device(s) 102A and 102B. The payment-service-system server 104 may transmit a new payment card number to the issuer processor server 123 after the payment-service-system server 104 generates the payment card number. In some instances, the payment-service-system server 104 may transmit a token that was generated by the payment-service-system server 104 to represent the payment card number, based on predetermined tokenization algorithms promulgated by the payment-service-system server 104. However, the client device(s) 102A and 102B may execute one or more digital wallet applications allowing the client device(s) 102A and 102B to securely store payment card numbers and conduct payment transactions using the client device(s) 102A and 102B instead of a physical payment card. The issuer processor server 123 may generate the cryptogram token for the payment card, using the payment card number and additional input parameters, and may transmit the cryptogram token directly or indirectly (through the payment-service-system server 104) to the client device(s) 102A and 102B for storage and use in digital wallet-based transactions.

Host Bank

A host bank may be a third-party financial institution that works in collaboration with the payment-service-system to provide various services to users through consumer-facing applications. The host bank system may have a bank server 106 and bank database 129. The bank server 106 may communicate with a payment-service-system server 104 via one or more networks, and may be any computing device comprising a processor configured to execute the various processes and tasks described herein. In operation, the bank server 106 may generate new bank accounts and may interact with the payment-service-system, issuer processor system, and a core processor system to debit or credit the various bank accounts managed by the host bank system. The host bank may have a bank database 129 that may store banking data for various accounts, including routing numbers, account numbers, and account ledgers, among other types of information. The bank server 106 may generate and update records of the bank database 129 based on new and updated account information received from the various entities, according to account update requests and transaction data.

In some embodiments, the payment-service-system may have one or more accounts with the host bank and user funds may be deposited into the account, where user-owned monies are tracked according to ledgers and user records in payment-service-system databases 107a-107n. In such embodiments, the bank server 106 may generate a routing number and account number for the payment-service-system, and various forms of information about the payment-service-system and transactions may be tracked in the bank database 129. Users who use the payment-service-system services to facilitate payments or for other services may deposit funds into the account of the payment-service-system held at the host bank. The payment-service-system server 104 may update a record of the user in the paymentservice-system databases 107a-107n to reflect the amount of user money held in the payment-service-system account at the host bank. The bank server 106 may update the amount of money in the payment-service-system account reflected in the account data and ledgers stored in the bank database 129, based on various transaction request messages received from the payment-service-system server 104. The payment-service-system server 104 may similarly update the amount of money belonging to the user in the payment-service-system databases 107a-107n, based on various transactions.

In some embodiments, the host bank may open and manage a financial account for each user registered in the payment-service-system databases 107a-107n. In such embodiments, the bank server 106 may receive instructions from the payment-service-system server 104 to open a new account for a user, when the user registers with the payment-service-system services, in response to some other trigger or instruction received from the payment-service-system server 104. The bank server 106 may execute one or more Know-Your-Customer (KYC) processes designed for collecting certain types of information about the user. In some cases, the bank server 106 or the payment-service-system server 104 may generate one or more graphical user interfaces (GUIs) configured to receive user information from the client device(s) 102A and 102B. And in some cases, the payment-service-system databases 107a-107n may contain the requisite KYC process data in a record of the user, which the payment-service-system server 104 may transmit to the bank server 106. The bank server 106 may generate one or more records for the user in bank databases 129, which may include generating a bank account number for the user. The bank server 106 may transmit the host bank account information for the user to the payment-service-system server 104, where the information may be stored into a record for the user in the payment-service-system databases 107a-107n, identified by a user ID associated with the user.

Payment-Service-System

A payment-service-system may comprise payment-service-system servers 104, which may be any computing device capable of performing various tasks and processes described herein. A payment-service-system server 104 may comprise a memory and a processor, whereby the memory comprises a set of computer-readable instructions that are executed by the processor. Although the payment-service-system server 104 is shown as a single server, it should be appreciated the functionality of a payment-service-system server 104 may be performed by any number of computing devices. In the example system 100, a payment-service-system server 104 may be coupled to issuer processor servers 123 and core processor servers 105, such that the payment-service-system server 104 may be situated between the issuer processor system and the core processor system. As mentioned previously, it should be appreciated that in some embodiments the payment-service-system server 104 may be configured to execute tasks and processes of an issuer processor server 123, such that the payment-service-system may function as an issuer processor system. It should also be appreciated that in some embodiments the payment-service-system server 104 may additionally or alternatively be configured to perform various tasks and processes of a core processor server 105, such that the payment-service-system may function as a core processor system.

Additionally, the payment-service-system system may have one or more payment-service-system databases 107 that store records of users, account and transaction ledgers, and other forms of information. Payment-service-system databases 107a-107n may be hosted on the machine-readable storage of one or more computing devices, such as servers, laptops, and desktops, among other types of computing devices. The payment-service-system databases 107 may comprise or may otherwise be coupled to a payment-service-system server 104 via one or more internal networks (not shown), within the operational boundaries of payment-service-system network devices.

Payment-service-system databases 107a-107n may include a user account database that stores user profile records containing data fields for various types of data; non-limiting examples of information stored in records of the user account database may include user identifiers (user ID), user payment card numbers, transaction data, bank account data, and machine-readable tokens representing payment card numbers, among other types of information about users and user accounts. In operation, a payment-service-system server 104 may generate and update a user record according to registration or demographic data received from the client device(s) 102A and 102B during a registration process; and according to transaction data received from the client device(s) 102A and 102B or other entities of the system 100, such as the host bank, issuer processor, and core processor, among other entities, during other processes.

As an example of processes affecting payment-service-system databases 107a-107n containing user information, in embodiments where the host bank holds accounts for each individual user, during a registration process the payment-service-system server 104 may receive a new account request and various types of user information and client device data from a client application published by the payment-service-system and executed by the client device(s) 102A and 102B. The payment-service-system server 104 may forward the request to a bank server 106 that may generate a new financial account for the user in the bank database 129, which may include generating and returning to the payment-service-system server 104 the routing number of the host bank and a unique account number for the user's new financial account. The payment-service-system server 104 may store into the user profile record of the payment-service-system databases 107a-107n, the data about the user, the data associated with the client application and/or the client device(s) 102A and 102B, and the data associated with new account held at the host bank. Alternatively, in embodiments where the host bank manages accounts for the payment-service-system entity, during the registration process the payment-service-system server 104 may generate the user record in the payment-service-system databases 107a-107n, and may update the user record to reflect amounts deposited or debited, into or out of the payment-service-system account held at the host bank. The payment-service-system server 104 may also receive from the client device(s) 102A and 102B and store into the user profile record of the payment-service-system databases 107a-107n, the data about the user, the data associated with the client application and/or the client device(s) 102A and 102B.

As another example of a process affecting payment-service-system databases 107a-107n that contains user information, the payment-service-system server 104 may receive a new card request from the client application executed by the client device(s) 102A and 102B, thereby prompting the payment-service-system server 104 to execute various processes for generating a unique new payment card number for the user. The payment-service-system server 104 may generate the payment card number and store the payment card number into the user record of the payment-service-system databases 107a-107n. In some implementations, the payment-service-system server 104 may execute a tokenization algorithm to generate a token that represents the payment card number, such that the token may operate as an alias or encoded representation of the payment card number. In such implementations, the payment-service-system server 104 may store the token into the payment-service-system databases 107a-107n records for the user, and may then exchange the token with various devices of the system 100 during operational processes, allowing the devices to communicate transaction data using the token instead of transmitting the payment card number "openly" over the various computing networks. The payment-service-system server 104 may transmit the token and/or payment card number to the client device(s) 102A and 102B for storage and later usage. In addition, the payment-service-system server 104 may transmit the payment card number to the issuer processor server 123, the bank server 106, and/or core processor server 105, or other computing device of entities that would require the payment card number generated for the user prior to any transactions being conducted using the payment card number.

A payment-service-system server 104 can communicate transaction data to a core processor server 105, which may record the payment authorization and other transaction data into a system of record database 110 and may further report the transaction data to the Federal Reserve and/or other entities that may be associated with the transaction. Although the core processor server 105 may transmit response messages indicating whether a transaction request associated with a user's payment card number should be authorized, The payment-service-system server 104 may make various determinations whether to confirm or otherwise authorization payments based on certain criteria, such as whether the transaction would cause an overdraft on the user account; such criteria may additionally or alternatively consider the recommendation of the response message, unless the recommendation to reject the transaction based on a legal authority to deny the transaction. In some implementations, the payment-service-system server 104 may be configured to reject all transaction requests until a request to activate a payment card number has been received from authorized client device(s) 102A and 102B associated with the user. Conventional systems may take several days to activate a new payment card and payment card number. But unlike conventional payment systems, a payment-service-system server 104 may be situated between the host bank and issuer processor, and thus the payment card numbers are capable of being active and used in real-time, the moment the card number is generated. As such, the payment-service-system server 104 transmits an active card number to the client device(s) 102A and 102B, among other parties of the system 100. For the user's protection, because the payment card is indeed active when the payment card number is transmitted to the client device(s) 102A and 102B, the payment-service-system server 104 may reject all payment transaction requested by default. Likewise, the activation status of the payment card number in a user record in the payment-service-system databases 107a-107n may indicate that the card number has not been activated yet. The payment-service-system server 104 may prompt the user, via a client-side GUI presented on the client device(s) 102A and 102B, to activate the card, even though the card is indeed active. The activation request from the client device(s) 102A and 102B may instruct the payment-service-system databases 107a-107n to update the activation status of the payment card number in the user profile to indicate the card has been activated, and thus the payment-service-system server 104 may authorize payment transaction satisfying any other criteria that might be verified by the payment-service-system server 104.

Devices of the payment-service-system may include, or may otherwise be coupled to, one or more user-facing networks 111, such as the Internet, through which client devices 102A of users may access the payment-service-system server 104 and payment-service-system databases 107. One having ordinary skill in the art would appreciate that the user-facing networks 111 may comprise any number of hardware and software computing-communications components configured to support communications between the client devices 102A and the payment-service-system server 104, where at least some of the networks 111 include internet protocol (IP) based networking technologies that allow the client devices 102A to communicate with the payment-service-system server 104. Non-limiting examples of components of the user-facing networks 111 may include routers, switches, firewalls, and the like.

Core Processor and System of Record

A core processor may be a financial institution responsible for authorizing transactions, releasing funds, managing a system of record database 110, and conducting various transaction and identity verification processes. The core processor entity may be a bank or a third party that provides software services to the bank allowing the bank to function as the core processor. Some financial institutions may maintain core processor servers 105 internal to the financial institution network boundaries. It should be appreciated that in some implementations the various entities may function as a core processor entity. For instance, in some circumstances, the core processor and the host bank may be the same entity, and thus the computing devices may be the same devices.

A core processor server 105 receives and updates a system of record database 110 that maintains the accurate information of the balance of an account maintained by various banks. Transactions may be pending or in various stages of the payment stream, but the official recordation of those transactions is by the system of record database 110. Certain parties, such as the account owner (e.g., user, payment-service-system), the merchant, the issuer processor, or the payment-service-system, may assume certain risks that an account holder does not have sufficient funds to fund a transaction, until the core processer server 105 authorizes the transaction and records the transaction in the system of record database 110.

In operation, when a payment-service-system server 104 receives a payment authorization request from a merchant computing device 121 via the various entities and devices, the payment-service-system server 104 can forward the associated transaction information to core processor server 105, which maintains an account corresponding to the payment card used in the payment transaction. The system of record database 110 may manage the account information using the core processor server 105, along with a ledger of transactions for the account and other user profile information. In some cases, the core processor server 105 may transmit account information, such as an indication for an amount of funds available to cover a transaction amount, to the payment-service-system server 104. The payment-service-system server 104 may determine based on preconfigured criteria whether to authorize the transaction based upon the account information received from the core processor server 105. As previously mentioned, in some embodiments, the payment-service-system server 104 may be configured to deny all transactions associated with a payment card number associated with a user profile in the payment-service-system databases 107*a*-107*n* until the an activation request is received from the user via authorized client device(s) 102A and 102B associated with the user, as indicated by the user profile record stored in payment-service-system databases 107. The payment-service-system server 104 may be configured to make additional or alternative determinations regarding authorizing payment transaction requests independent of the core processor server 105 determinations and indications. For instance, the payment-service-system server 104 may reject transaction requests associated with the payment card number of the user when the payment-service-system server 104 determines that there would be overdraft the account, even though the bank hosting the account of the user would permit the overdraft.

The payment-service-system server 104 can communicate transactions to the core processor server 105, which may update the system of record database 110 transaction information associated with user accounts registered with the payment-service-system services. The core processor server 105 may further report the transaction data and the daily ledger results in the system of record database 110 to the Federal Reserve and any other banks that maintain account records associated with the payment card used in payment authorizations and transactions. In some instances, the core processor server 105 may generate an authorization response that may be forwarded through the payment-service-system server 104 to various devices and entities of the system 100 (e.g., merchants, issuer processor, merchant-acquirer, merchant), in order to confirm how the merchant may complete the payment transaction, indicating whether the transaction request was authorized or rejected by any particular entity in the payment authorization stream of the system 100.

In the conventional payment stream, an issuer processor typically forwards payment authorization requests to a core processor server 105. However, according to embodiments described in the disclosure, such as the example system 100, and variations of such embodiments, a payment-service-system server 104 is situated between an issuer processor server 123 and a core processor server 105. Situating the payment-service-system server 104 between issuer processor server 123 and core processor server 105 allows for the payment-service-system server 104 to intervene in and record transactions in the payment stream, such as payment authorizations. Consequently, the payment-service-system server 104 can have visibility into data generated for all transactions associated with a user's account and payment card number to provide additional services to the user using the account. As such, the payment-service-system server 104 may execute additional features and transaction processes that were not available in the conventional payment and financial systems. Furthermore, the payment-service-system server 104 can perform some or all of the functions typically associated with issuer processors, and therefore, in some embodiments, the merchant-acquirer can communicate directly with the payment-service-system server 104. In other words, some embodiment may facilitate collapsing the number of entities required to be involved in conventional payment transaction processing streams.

Client Device

Client device(s) 102A and 102B may be any computing devices capable of executing a locally-installed application or accessing a web-based application executed by a payment-service-system server 104. Non-limiting examples of client devices may include s mobile phone, tablet, smart watch, personal data assistant, gaming console, and personal computer, among other computing devices. The client device(s) 102A and 102B may transmit various forms of device data with user data, during registration, authorization, and verification processes. For example, during a registration process, the user may input into a registration GUI presented on the client device(s) 102A and 102B, demographic information associated with the user (e.g., name, DOB, addresses, social security number). In addition, the client application may query a MAC address of the client device(s) 102A and 102B and an IP address of the client device(s) 102A and 102B, as well as other types of information about the client device(s) 102A and 102B. The device data may be submitted with the user data during the registration process, and may be stored in the user record in the payment-service-system databases 107a-107n. As another example, a tokenization algorithm designed to mask the actual payment card number generated by the payment-service-system server 104 may use data inputs, such as the user ID of the user and/or a device identifier (device ID) associated with the client device(s) 102A and 102B; the device ID may be generated by the payment-service-system server 104 according to various input values, or the device ID may be an existing data field, such as the MAC address of the client device(s) 102A and 102B. As mentioned, the client device(s) 102A and 102B may access and communicate with the payment-service-system server 104 over one or more user-facing networks 111 (e.g., the internet).

Figure 2:
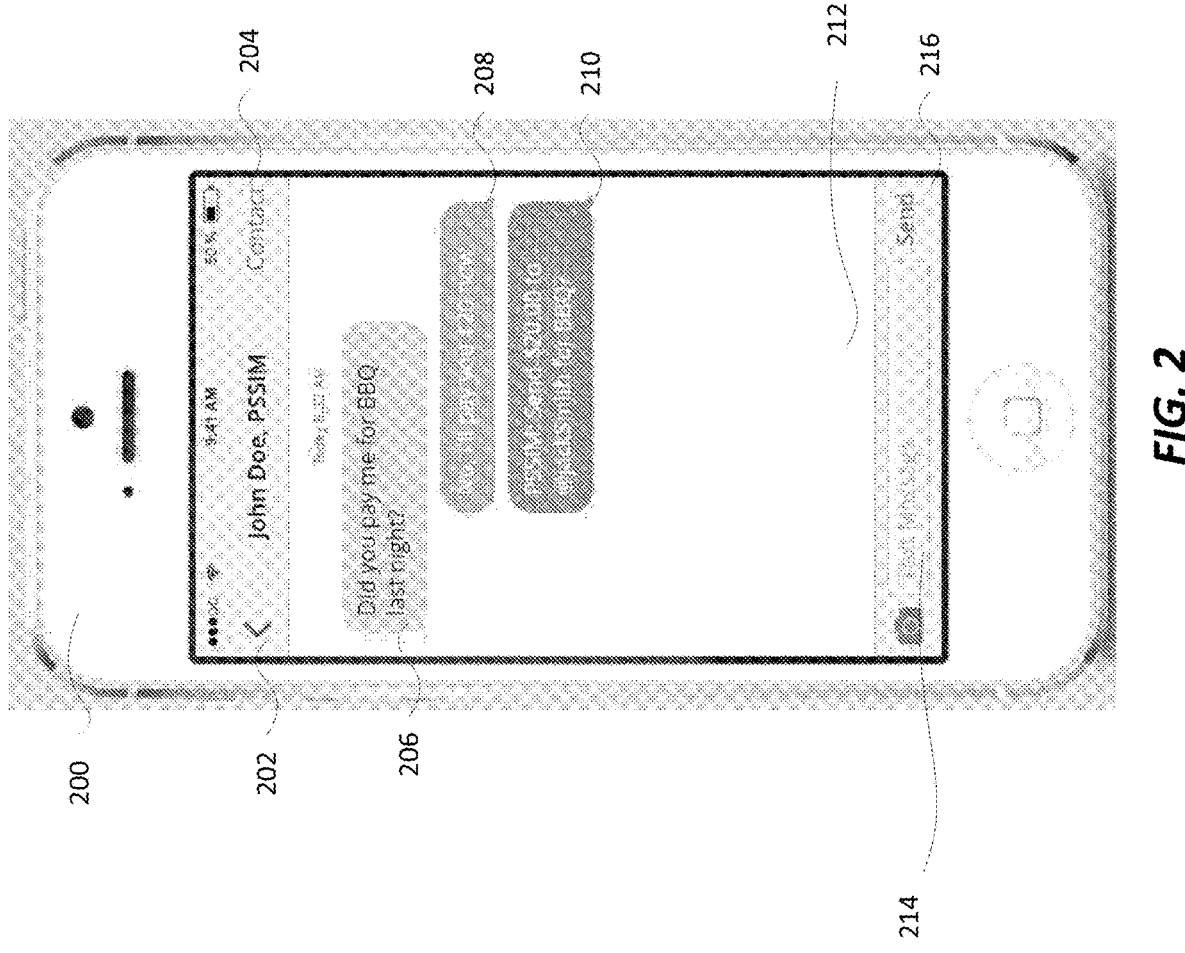
FIG. 2 illustrates an example messaging application with the ability to make a payment request, according to an embodiment.
Figure 3:
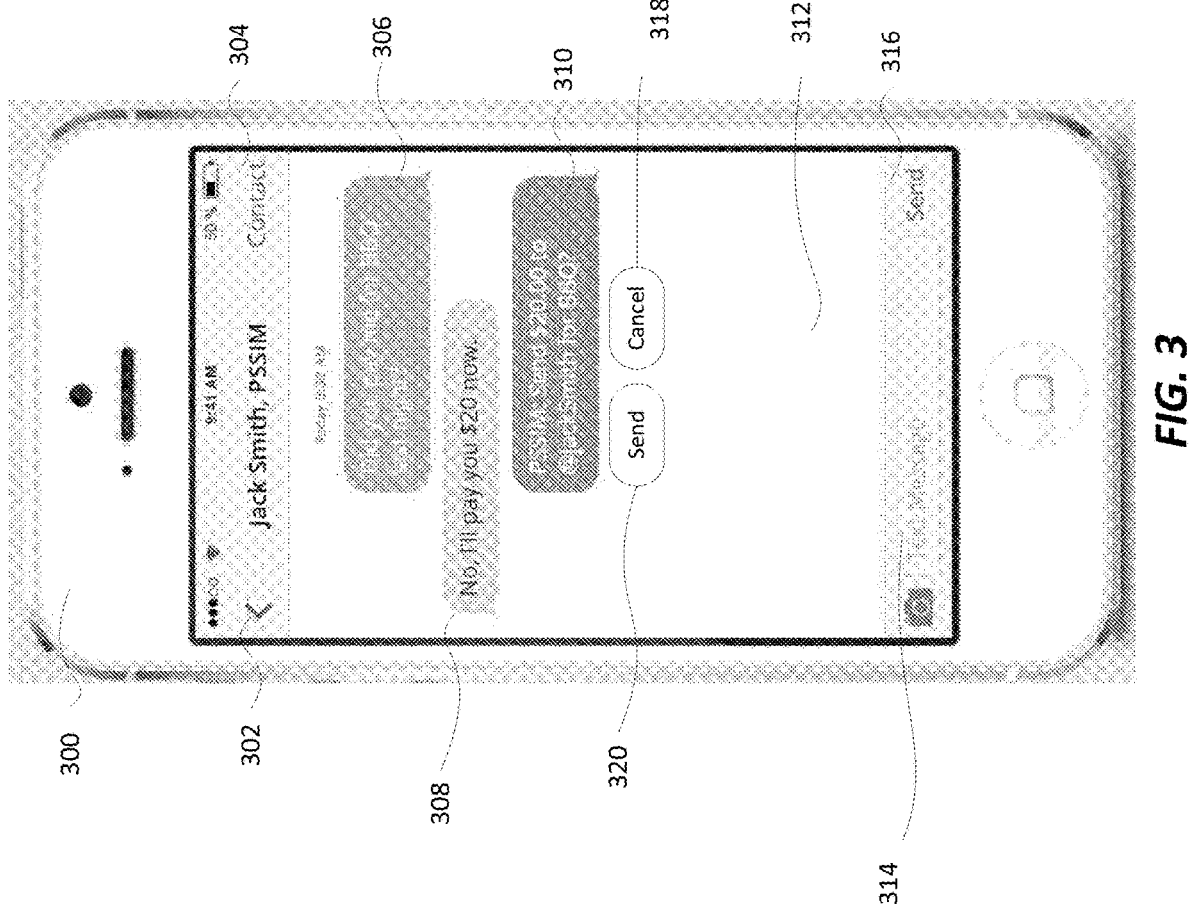
FIG. 3 illustrates a second example of a messaging application with the ability to receive a payment request, according to an embodiment.

As explained, the payment-service-system server 104 can have visibility to transaction information from both the merchant computing device 121 and the client device(s) 102A and 102B. Regarding the client device(s) 102A and 102B, the information can include account balances, credit and debit history, user-identifying information, and other transaction history. Regarding the merchant computing device 121, the information can include sales history (including item descriptions and prices), inventory, funds transfers, purchase history, restaurant party size, and special offers. By having access to all of this information, the system illustrated in FIG. 1 can provide additional features, such as offering to split checks at restaurants, making purchasing suggestions, or recalling past purchases for repayment. FIGS. 2 and 3 illustrate an example messaging application. For example, a software agent or the payment-service-system server can recall transaction history information associated with the context of a messaging conversation, and use the information to suggest payments or provide reminders to the users about what transpired, e.g., "You had dinner at El Mitch's Sit-Eat-And-Go last Thursday and spent $37.59."

FIG. 2 illustrates two users, John Doe and Jack Smith, communicating using human-readable syntax in messaging application 212. Messaging application 212 running on Jack Smith's user computing device 200. The messaging application 212 includes a back button 202 to view other messages and a contacts button 204 to view additional contacts to add to a conversation, or to start a new conversation with. Prior to commencing the message, Jack Smith can select, via contacts button 204, John Doe and a third-party messaging application, payment-service-system instant messenger ("PSSIM"), to the conversation. The example conversation includes a message 206 from Jack Smith to John Doe stating, "Did you pay me for BBQ last night?" Jack Smith can enter human-readable textual inputs in the text message field 214 and send the messages by pressing the send button 216. The example conversation includes a response from John Doe in message 208 stating, "No, I'll pay you $20 now." A third-party messaging application can identify the offer to pay by, for example, identifying that the message 206 contains the word "pay" and the string "$20." The third-party messaging application can also identify predefined identifiers, such as keywords or characters, such as currency indicators (e.g., $, €, £, or ¥), payment words (e.g., pay, sale, sold, owe, or repay), and an amount, (e.g., twenty or 20). The payment-service-system server can also identify the reason for the payment by identifying nouns that are nearby the currency indicator. In the example of FIG. 2, the payment-service-system can identify the noun "BBQ" in message 206 and "$20" in message 208 as a reason associated with the payment command, to make clear what the payment is for.

The server 104 can receive this information via software agent 114, and, based on identifying these strings, can suggest that John Doe make a payment by sending message 210. The server 104 can also identify payment-service-system usernames for both Jack Smith and John doe, based on user identifying information, such as phone numbers. After identifying user names and the intent to make a payment, the server 104 can generate a message, such as, "PSSIM: Send $20.00 to @jackSmith for BBQ?" The colors of the messages 206, 208, and 210 can be different colors to identify them as from different senders. Alternatively, the messages can have usernames, pictures, or some other distinguishing characteristics to identify that they are from different senders.

FIG. 3 illustrates an example of the conversation on John Doe's user computing device 300. The user computing device 300 is illustrated with a messaging application 312 that has elements similar to those of messaging application 212, including back button 302, contacts button 304, text message field 314, and send button 316. In addition, the messages are generally the same, but can appear on different sides because the sender and receiver are switched. In this example, message 306 corresponds with 206; message 308 corresponds with 208, and message 310 corresponds with 210. However, since John Doe is the one sending money to Jack Smith, the messaging application 312 can include send button 320 and cancel button 318 corresponding to the message 310, stating, "PSSIM: Send $20.00 to @jackSmith for BBQ?" By pressing send button 320, John Doe can initiate a payment transaction to Jack Smith. By pressing cancel button, John Doe can notify the payment-service-system server that he does not want to complete a payment transaction.

Send button 320 and cancel button 318 can be generated using an API of messaging application 312. The payment-service-system server can use the API to generate the two buttons 320 and 318, the strings (send and cancel) in the buttons, and the response to pressing the buttons, e.g., return a message corresponding to the pressed button to the payment-service-system server. The payment-service-system server can then either continue to process the payment or discontinue suggesting the payment option after receiving the cancel message. For example, if the payment-service-system server sees another transaction for $20 for BBQ, the payment-service-system server can ignore that possible transaction because the user already declined that payment transaction. However, other embodiments can suggest the same payment option again, and the payment-service-system server can include a feature to allow users to set preferences on whether to repeat a past payment suggestion.

In an alternative embodiment, some messaging applications might not have an API for generating buttons. In these embodiments, users can respond to the third-party messaging application with human-readable commands, such as send or cancel. Other strings are possible too, such as "Yes, send $20" "OK" "Sounds good" and the like. If the payment-service-system server is unsure of the user's response, it can request a confirmation by sending another message, e.g., "Confirm request to send $20.00 to Jack Smith, respond with Yes or No." Note that this embodiment can be combined with an embodiment that does allow for button APIs. In these embodiments, the user can either press the send button 320, or respond with a send command or similar. In either case, the user can initiate a payment request as further illustrated in FIG. 4.

In still further embodiments, the payment-service-system server can be more explicit as to the messages it expects to receive from a user. For example, message 310 can instead state, "PSSIM: Send $20.00 to @jackSmith for BBQ? Respond with Send or Cancel." If John Doe responds with anything but Send or Cancel, then the payment-service-system server can repeat the message, send a different message clarifying the desired response, or send a message that there will not be a payment transaction.

Embodiments can include a timeout mechanism, such that if the user does not respond within a predetermined time period, e.g., five minutes, then the payment-service-system server can send a message identifying that there will be no payment transaction, e.g., "The response time has elapsed. Please visit [URL] if you want to make a payment."

Similarly, if the user expressly cancels the payment by sending a cancel message, either by pressing a cancel button or sending a message to cancel the transaction, the payment-service-system server can send a message confirming the termination of the payment transaction, e.g., "Payment transaction terminated." In other embodiments, the payment-service-system server will not respond with a message, assuming that the user understands that there will be no payment transaction.

Figure 4:
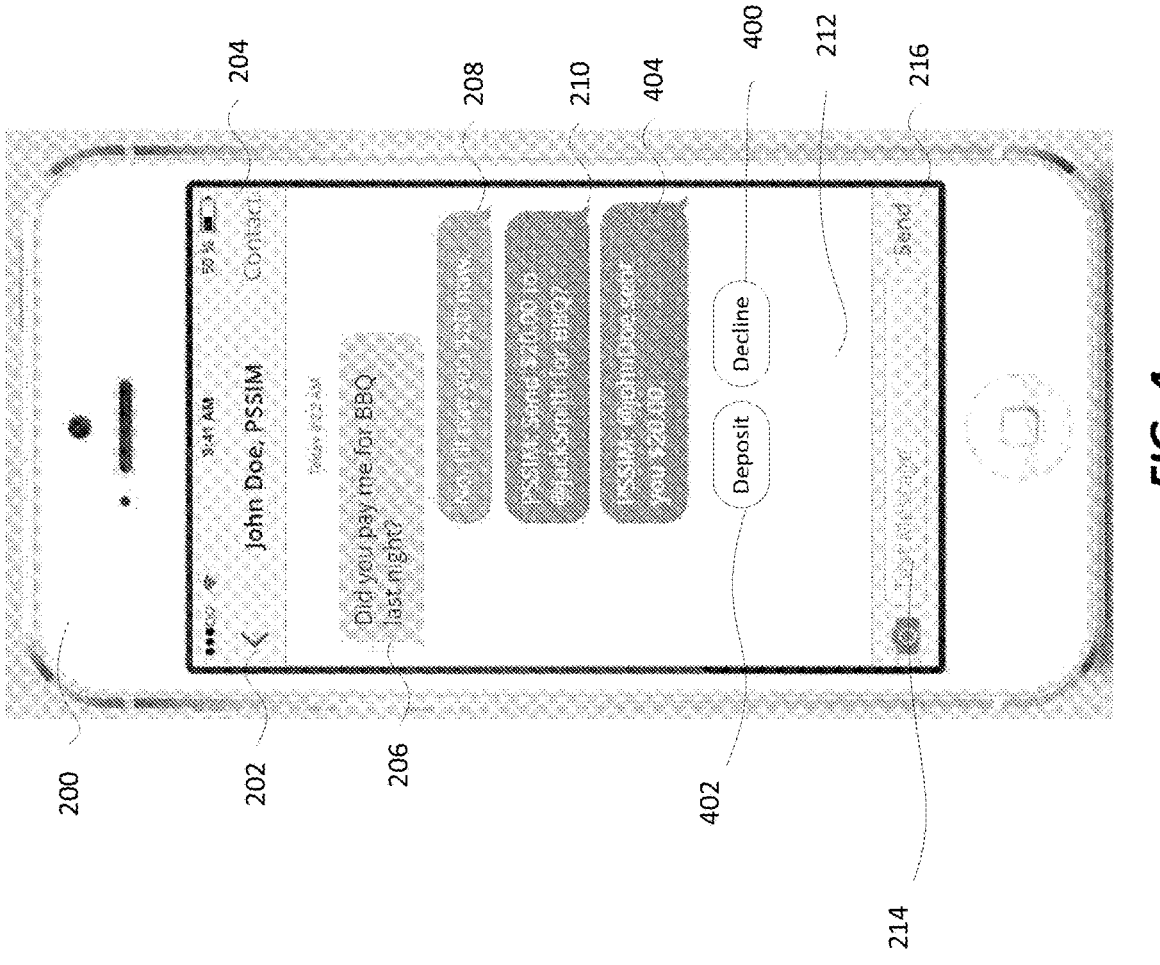
FIG. 4 illustrates a third example of a messaging application with the ability to receive a payment request, according to an embodiment.

FIG. 4 illustrates an embodiment in which John Doe notified the payment-service-system server that he wanted to proceed with a payment transaction, e.g., pressed the Send button 320. In response to identifying a possible payment request, the payment-service-system server can generate a message 404, stating, for example, "PSSIM: @johnDoe sent you $20.00." In addition, the third-party messaging application 212 can also display a Deposit button 402 and a Decline button 400. As previously explained, these buttons can be generated using an API, and pressing the buttons can cause a message to be returned to the third-party messaging application.

In this example, if Jack Smith presses the Deposit button 402, this can generate a confirmation that Jack Smith accepts the $20, and the server 104 can transfer funds from an account corresponding to John Doe to an account corresponding to Jack Smith. Upon completing the funds transfer, the server 104 can send a message confirming completion, such as, "Transfer of $20.00 from @johnDoe to @jackSmith completed."

If Jack Smith presses the Decline button 400, then the messaging application 212 can transmit a decline message to server 104. In response, the server 104 can terminate the payment transaction and generate a message, such as, "@jackSmith declined the $20.00." (Not illustrated).

Alternative embodiments can use computer-readable syntax. For example, John Doe can input a computer-readable command, such as "/PSSIM $20 @jackSmith BBQ." The payment-service-system server can then automatically effect the payment without further input from either user, or the process can pick up similar to FIG. 4. That is, the payment-service-system can generate a message to Jack Smith to determine whether he approves depositing the funds or would rather cancel the transaction.

Figure 5A:
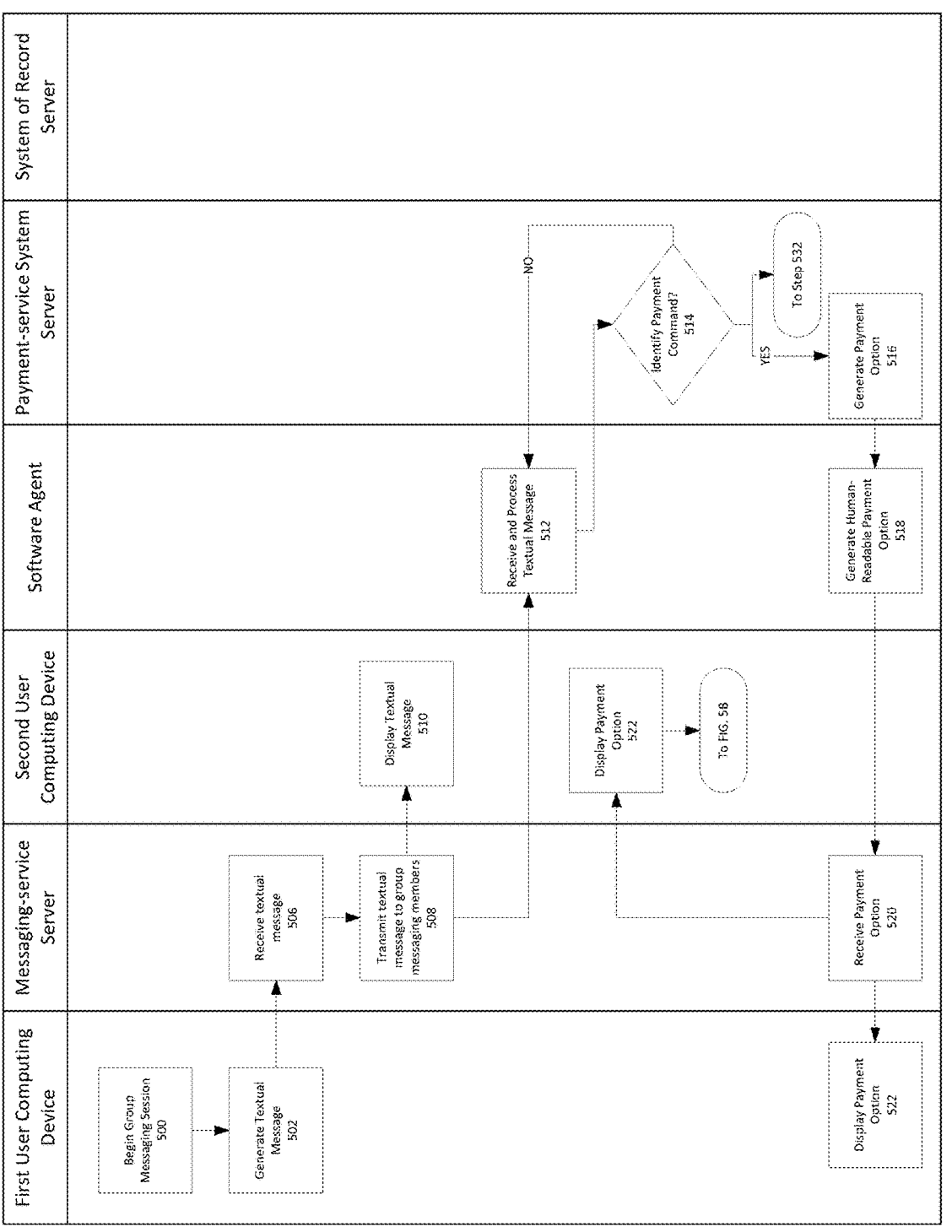
FIG. 5A-B illustrates an example of seamless integration of a third-party payment application with a native communication application to send a payment, according to an embodiment.
Figure 5B:
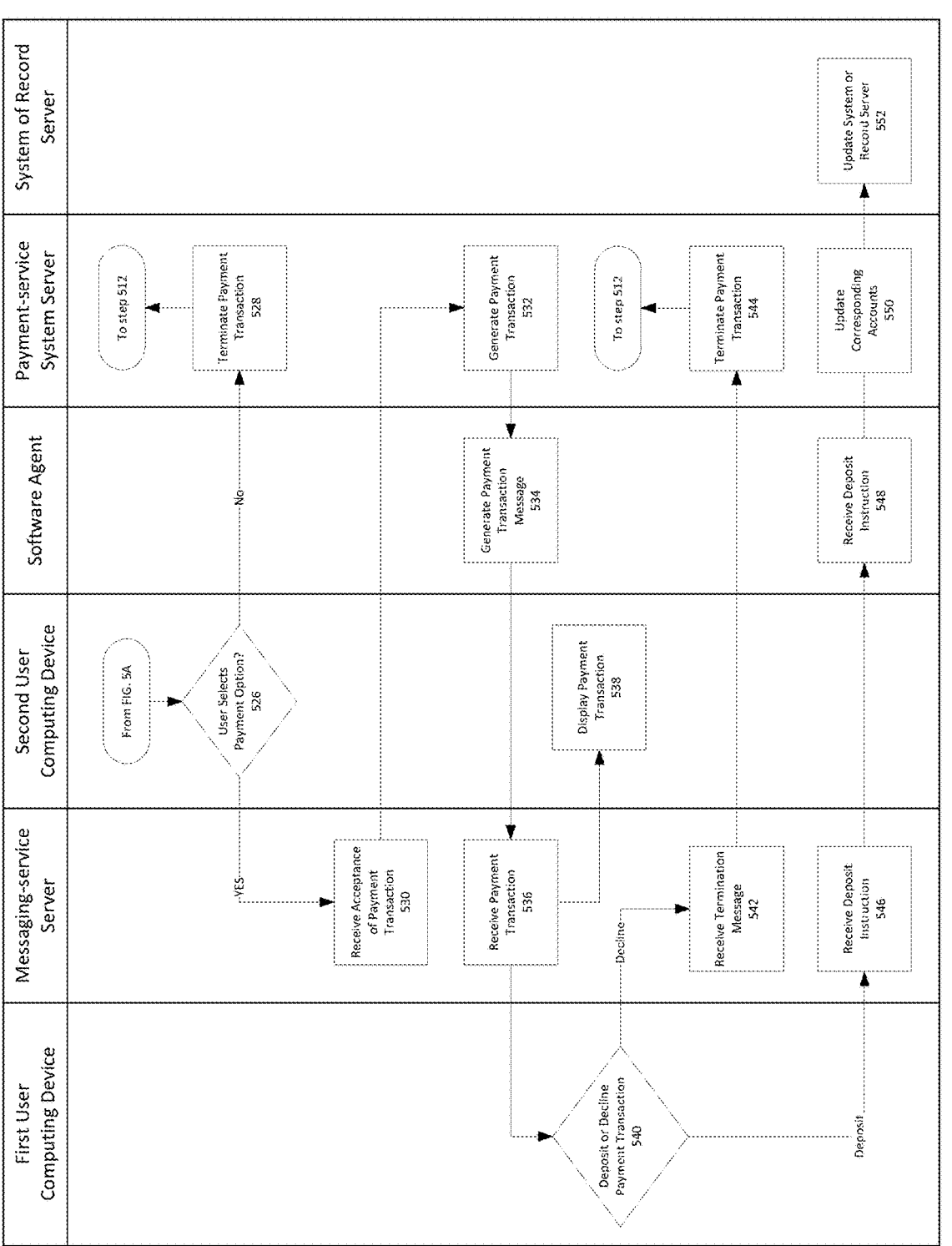

FIGS. 5A and 5B further illustrate an example process for an automated third-party messaging application for providing payments. The process includes a system comprising at least six components: a first user computing device, a messaging-service server, a second user computing device, a software agent, a payment-service-system server, and a system of record server. Note that the software agent can run on the payment-service-system server or on a separate computing device. Starting with step 500, the first user computing device begins a group messaging session. This can include adding participants to a list of recipients. In this example, the recipients can include at least a second user computing device and a payment-service-system, but more participants in the group are possible. Next, in step 502, the first user computing device can generate a human-readable textual message that can include a human-readable textual command, and transmit the message to the messaging-service server. The human-readable textual message can include a message text portion and the list of recipients. Each recipient can be identified by a unique identifier, e.g., a username or phone number. The messaging-service server can receive the human-readable textual message (step 506) and identify the recipients by the unique identifiers or payment proxies in the human-readable textual messages. In step 508, the messaging-service server can forward the human-readable textual messages to the recipients of the group message. The second user computing device can display the message in step 510, and the payment-service-system server can receive the human-readable textual message or human-readable textual input in step 512.

The payment-service-system server can then process the human-readable textual message to identify a potential payment request command in step 514. In some embodiments, the payment-service-system can verify that the potential payment request is made between participants of the conversation, and not identify a potential payment request if the conversation implies a payment to a person that is not a participant of the conversation. In other embodiments, the server 104 can process payment between a participant of the conversation and a party that is not a participant. If there is no potential payment request, the payment-service-system server returns to a wait state for receiving another message in step 512. To identify a payment command, the payment-service-system can identify predefined keywords or characters, such as currency indicators (e.g., $, €, £, or ¥), payment words (e.g., pay, sale, sold, owe, or repay), and an amount, (e.g., twenty or 20). The payment-service-system server can also identify the reason for the payment by identifying nouns that are nearby the currency indicator. In the example of FIG. 2, the payment-service-system can identify the noun "BBQ" in message 206 and "$20" in message 208, and identify this information as a human-readable textual command potentially related to a payment. The first and second user computing devices can correspond to unique user identifiers, such as phone numbers or online usernames. The payment-service-system server can also automatically identify whether the first and second user computing devices are associated with payment accounts on the payment-service-system server. To do this, the payment-service-system server can query a database to assess whether the unique user identifiers correspond to accounts. If the unique identifiers are associated with accounts, and the payment-service-system identified a payment command, the payment-service-system instant messaging application can suggest that the users might be interested in a payment option, and generate such an option in step 516. Alternatively, the payment-service-system server can generate a payment transaction and seek immediate approval of the payee using the second user computing device, and proceed directly to step 532. In this embodiment, the process can skip steps 516-530. Alternatively, the process can proceed with these steps in parallel, and terminate when each party either cancels or approves the transaction. If the unique user identifiers are not associated with an account, the payment-service-system server can optionally allow one or more of the users to identify themselves by their user names, or ask them to associate their unique identifier with their account via a separate webpage. In step 518, the software agent can convert the payment option into a human-readable message (e.g., "Would you like to send user $20?") for transmission to the messaging-service server. In step 520, the messaging-service server can receive the payment option from the payment-service-system server, and forward the payment option to the first user computing device (step 522) and to the second user computing device (step 524). FIG. 5B continues the process.

In FIG. 5B, the second user computing device can choose whether to continue with the payment option in step 526. As an example, FIG. 3 illustrates the giving a second user computing device an option press Send button 320 or Cancel button 318. Optionally, the payment-service-system server can timeout if the second user computing device does not respond within a predetermined time, e.g., 2 minutes, in which case the payment transaction can terminate in step 528. Similarly, if the second user presses the Cancel button 318, the process can continue to step 528, which terminates the payment transaction. (Note that the message may alternatively go to the software agent first). If the second user presses the Send button 320, the second user computing device can send an acceptance message to the messaging-service server in step 530, which then forwards the message to the payment-service-system server. (Note that the message may alternatively go to the software agent first.) The payment-service-system server can generate a payment transaction or suggestion to complete a payment transaction in step 532. Also in step 532, the payment-service-system server can verify that the sender of the message is the person that is sending the funds. Because at least two parties, a sender and a receiver, are part of the group messaging session, the payment-service-system server receives messages from both users. Therefore, as a layer of security, the payment-service-system server can ignore messages masquerading as selections from the recipient, and only continue if the payment-service-system server receives a response from the appropriate party. The payment-service-system server can transmit the payment transaction to the software agent, in step 534, which can then transform the payment transaction into a human-readable form. For example, if the payment transaction includes an amount, a recipient, and deposit or decline options, the software agent can transform these fields into a message, such as, "Would you like to deposit or decline the $20 from Steve?" The software agent can then transmit the payment transaction to the messaging-service server in step 536, which can then forward it to the second user computing device in step 538, and to the first user computing device in step 540.

FIG. 4 illustrates an example payment transaction displayed on a first user device, which can include an identifier of the sender or recipient and the amount. On the first user computing device, the payment transaction can include the Deposit button 402 and the Decline button 400, whereas the second user computing device can just display the message. If the first user presses the Decline button 400, the first user computing device can send a termination message to the messaging-service server in step 542. The messaging-service server can forward the termination message to the payment-service-system server in step 544. The payment-service-system server can then return to step 512 and wait to identify another payment command. If the first user presses the Deposit button 402, the process can proceed to step 546, in which the messaging-service server can receive a deposit instruction or payment confirmation message, which it can forward to the software agent in step 548 (and optionally the second user computing device.) In step 550, which can include executing a payment instruction to debit an account corresponding to the second user and to credit an account corresponding to the first user. Also in step 552, the payment-service-system server can verify that the sender of the message is the person that is receiving the funds. Because at least two parties, a sender and a receiver, are part of the group messaging session, the payment-service-system server receives messages from both users. Therefore, as a layer of security, the payment-service-system server can ignore messages masquerading as selections from the appropriate party, and only continue if the payment-service-system server receives a response from the recipient. The payment-service-system server can then update a system of record server in step 548, to ensure that the transaction is properly recorded in a system of record database.

The above processes described examples, such as steps 528 and 544, of users terminating the transactions. The payment-service-system server can also offer other options for users to cancel a transaction. For example, the payment-service-system server can terminate a transaction when a user types the words "terminate" or "cancel." If the process terminates for any reason, the payment-service-system server can avoid offering a similar payment transaction in the future. For example, the payment-service-system can ignore similar payment requests forever of for a predetermined time, e.g., 1-24 hours. If, after the predetermined time, the payment-service-system server identifies a similar or identical payment request, it can make the same offer again. If the predefined time has not elapsed, the payment-service-system server can ignore the payment request.

Figure 6:
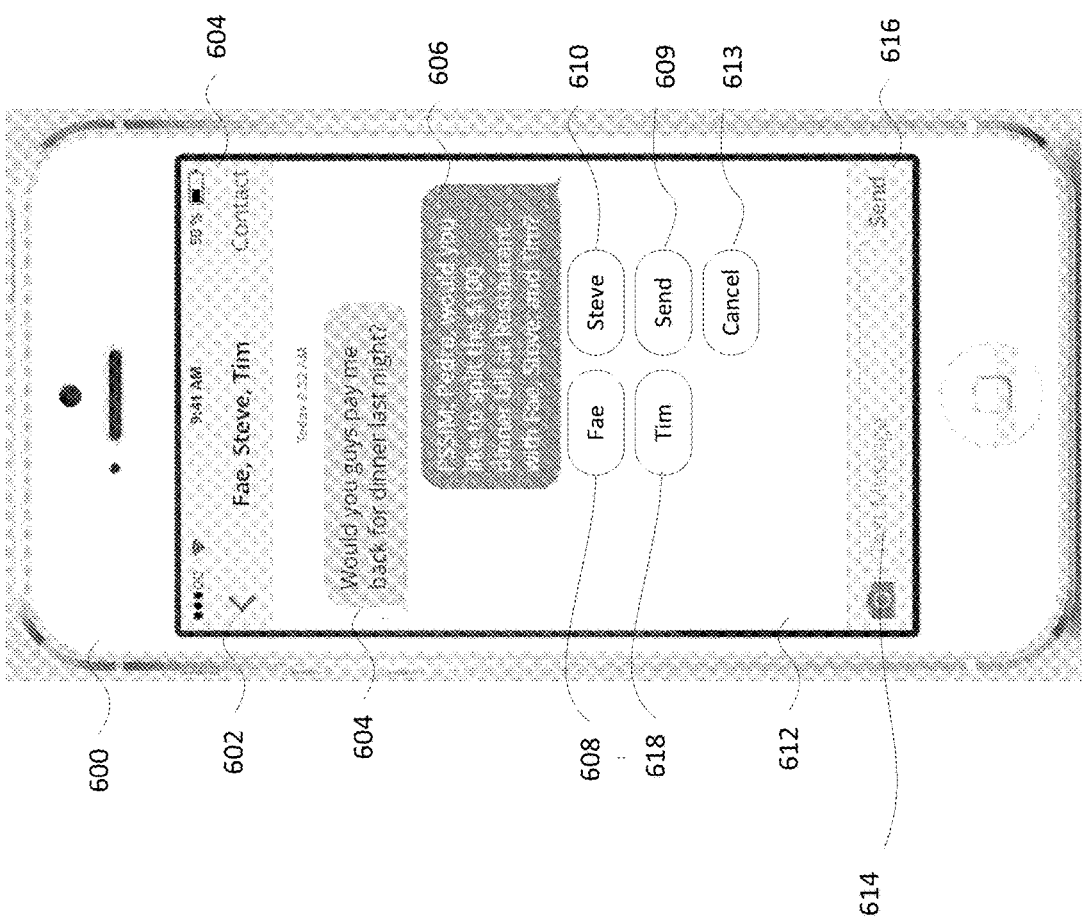
FIG. 6 illustrates an example messaging application with the ability to make a payment request using information from a previous purchase made in a system, according to an embodiment.
Figure 7:
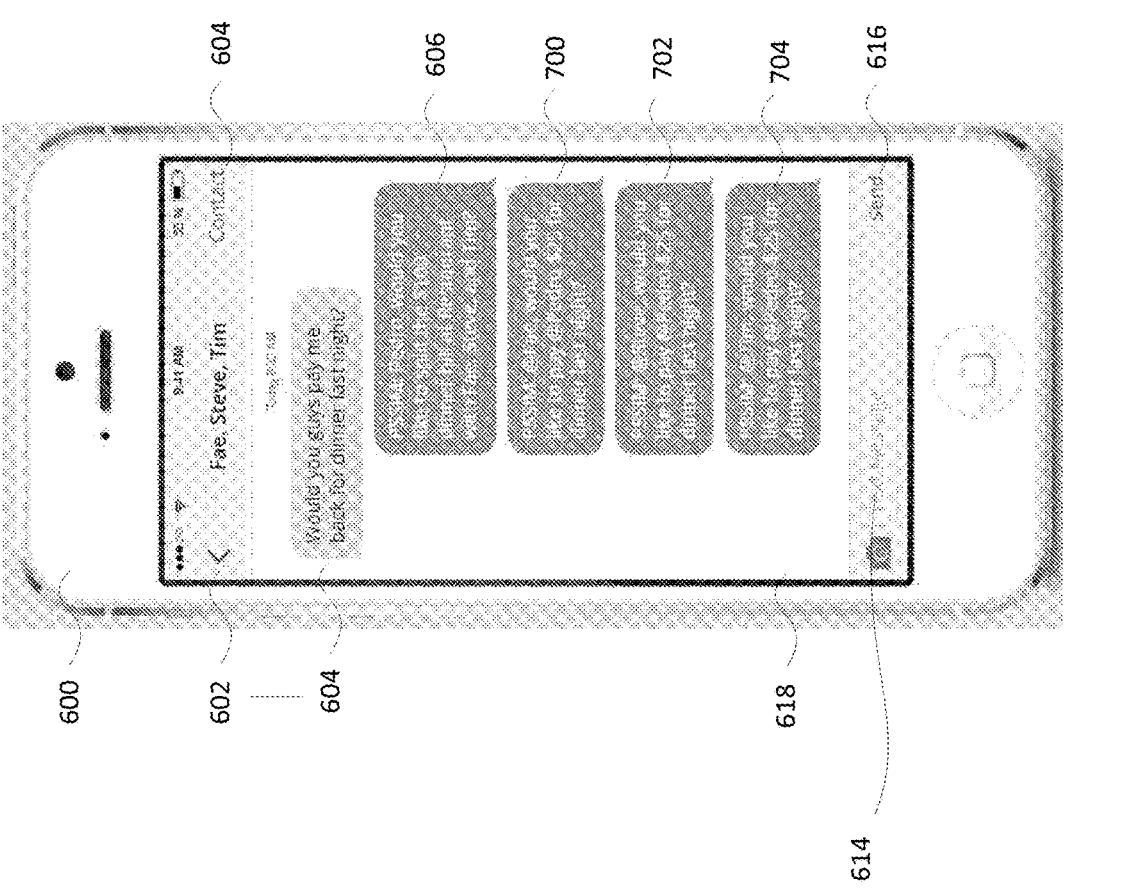
FIG. 7 illustrates a second example messaging application with the ability to make a payment request using information from a previous purchase made in a system, according to an embodiment.
Figure 8:
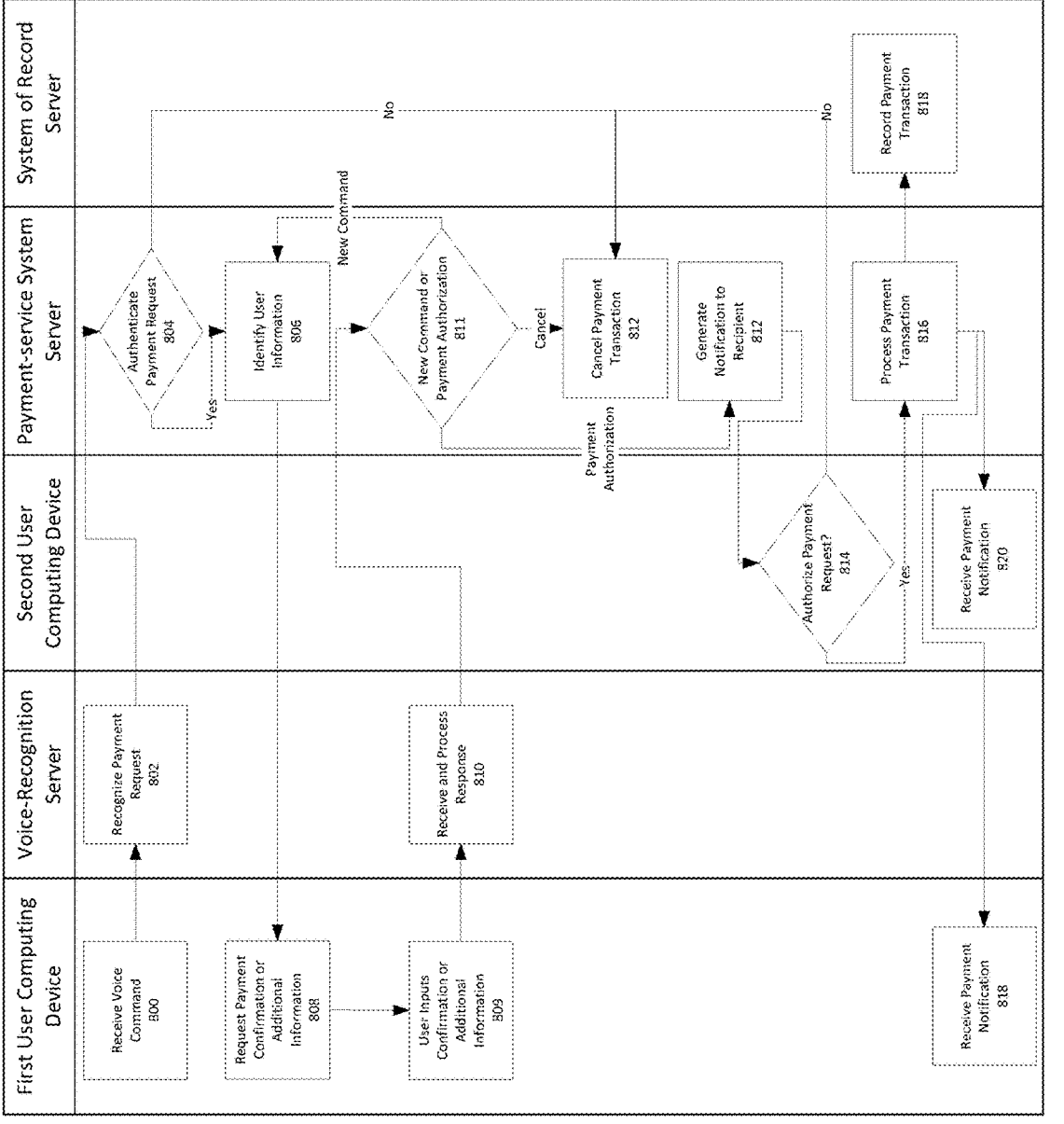
FIG. 8 illustrates an example process processing a payment request using natural-language processing.

FIGS. 6-8 illustrate an offer to split checks. The payment-service-system server 104 can receive purchase information related to a multi-party restaurant bill from a merchant computing device 121, where one user paid the entire bill. The user computing device 600 is illustrated with a messaging application 612 that has elements similar to those of messaging application 212, including back button 602, contacts button 604, text message field 614, and send button 616. The purchase information on the multi-party restaurant bill can include amount, party size, and itemized purchases with descriptions. If the party size is 4 and the bill is for $100, for example, then each person could pay one-fourth, or $25. If the one who paid is in a 4-way group messaging conversation, and the conversation includes information associated with the multi-party restaurant bill, such as the amount, the 4-way split amount, the restaurant name, or the items purchased, then the payment-service-system server can offer suggestions to the users, such as offering to repay the 4-way split amount or recalling purchase information. As an example, in FIG. 6, the payor, Pedro, can send a message 604, such as, "Would you guys pay me back for dinner last night?" Upon receiving this message, the payment-service-system can automatically identify purchase information consistent with a restaurant dinner expense from the previous evening. The purchase information can be stored in one or more databases 107*a-n*. Once recalled, the purchase information can include the number of people at the table, which in this example is four. The payment-service-system server can also identify user information based on unique identifiers of the participants in the group messaging conversation. As previously explained, the payment-service-system server can look up user information based on unique identifiers, such as phone numbers or user names. In this case, the payment-service-system server can identify the other parties as Fae, Steve, and Tim. If the group messaging conversation has four people in it, the payment-service-system server can decide to offer to split payment amongst the four group messaging participants. If there are not four participants, the payment-service-system server can decide not to offer to split the payment, or it still can, suggesting that perhaps at least some of the group messaging participants were also at the dinner.

In one embodiment, after receiving a message (e.g., message 604) related to a possible payment request involving a multi-way split of a bill, the payment-service-system server can send a message 606 to suggest a payment, such as, "PSSIM: Pedro, would you like to split the $100 dinner bill at Restaurant with Fae, Steve, and Tim?" offering Pedro to request payment. When making the payment suggestion, the payment-service-system server can request that Pedro, who needs reimbursement, select participants from the group message to send payment requests to. In this way, Pedro can explicitly identify those who owe him by one or more of buttons 608, 610, and 618, corresponding to Fae, Steve, and Tim, respectively. After Pedro selects who should receive payment requests, (e.g., select each person or only a couple) he can press send button 609. Alternatively, Pedro can press cancel button 613 to terminate the payment transaction. Embodiments can also allow a natural language response, such as "yes," or "yes, but only Fae and Steve."

After the payment-service-system server receives a response, the payment process can proceed similar to the process as illustrated in FIGS. 5A-5B, except that instead of one payor second user computing device, there is also a third and a fourth user computing device, which each behave similarly to the illustrated second user computing device. FIG. 7 illustrates the process from the point of view if the payee using user computing device 600. In this example, Pedro selected each of Fae, Steve, and Tim to receive payment requests, represented by messages 700, 702, and 704, respectively. Each of these users can receive the all the messages, and decide whether to proceed using buttons similar to those illustrated in FIG. 3. However, since the payment-service-system server knows who originates each message, the payment-service-system server will know who responds to each question, and can keep track who approved paying for the split checked-the payment-service-system can ignore responses if they do not come from the correct person. After receiving responses from Fae, Steve and Tim, the payment-service-system server can generate one or more messages to request that Pedro deposit or decline the payments using buttons similar to those illustrated in FIG. 4. Alternatively, Pedro can input a natural language response, such as "yes," or "please deposit the funds."

Rather than paying splitting the bill into fourths, the bill could be split up by entrees. For example, Pedro can assign meals to each user, e.g., Fae ordered fries, Steve ordered salami, and Ted ordered Texas BBQ. The payment-service-system server could send purchase information, including an itemized bill, and anyone could split the various menu items, and any remaining items such as appetizers could be split in fourths. The payment-service-system server can also calculate tax and tip to split those items appropriately based on what users purchased.

In addition to the check splitting embodiment, users can split other purchases, such as groceries or items purchased for others. The payment-service-system server could recall the cost of these items and split them between other participants m an instant messaging application in a manner similar to that described in the context of FIGS. 6-8.

In another embodiment, the payment-service-system server can also make other suggestions to participants in an instant messaging conversation. For instance, if the payment-service-system server notices users discussing getting coffee, the payment-service-system server can suggest making a transaction similar to past transactions, such as prepurchasing a specialty coffee drink that the user has purchased in the past. Upon receiving a confirmation that the user would like to make the purchase, the payment-service-system server can contact a merchant computing device to notify it of the transaction and to make the specialty coffee drink for the user to pick up.

The client device(s) 102A and 102B can also be voice-activated and process natural language, such as voice-controlled speakers (e.g., Amazon Echo Google Home) or a virtual assistant that listens for verbal commands (e.g., Microsoft Cortana, Google Now, or Apple Siri). These voice-activated devices can include APis for adding third-party applications. One such third-party application can be a payment application activated through voice-operated commands. FIG. 6 illustrates an embodiment for processing a payment using a voice-controlled speaker.

Users can configure their voice-controlled speakers or personal assistants (i.e., user computing device) or their payment-service-system server accounts to process natural language payment commands received at microphones at such devices. To do this, the user can, for example, make voice commands, audible instructions, or audible payment keywords (e.g., "register with payment-service-system server") to register an account on a payment-service-system server with their user computing device. The payment-service-system server can respond with follow-up questions to authenticate the user, such as their password or with security questions. The payment-service-system server can also use two-factor authentication by requesting that the user verify the registration via a pre-registered second user computing device, such as a smartphone or by clicking a link in an email. Alternatively, the user can logon to a website of the payment-service-system server to pre-authorize the user computing device to use payment commands. Embodiments can also require special keywords to prevent others from making unauthorized payment commands FIG. 8 illustrates an embodiment for processing payments using voice-activated commands on a voice-controlled speaker or a virtual assistant, which FIG. 8 illustrates as a first user computing device. The first user computing device can receive a voice command in step 800. The voice command can include an activation command to notify the first user computing device to listen for a command. An activation command can include the press of a button or a keyword, such as "wakeup." Once listening, the user can speak a payment request and a recipient identifier to the first user computing device, such as, "Please pay John $20" or "Please request $25 from John." The payment request can also optionally include a password or secret keyword to authenticate the payment request. The audible instructions can be encoded into an audio file, e.g., MP3, FLAC, or AAC. After receiving the voice command, the first user computing device can transmit the payment request to a voice-recognition server to do the natural-language processing or a voice-recognition algorithm in step 802. The voice-recognition can include identifying parameters for the payment request, including a recipient, an amount, a reason for the payment request, and optional authentication information, such as a password or secret keyword to complete the payment transaction. After identifying the command as a payment request, the voice-recognition server can identify a sender identifier based on user information associated with the voice-controlled speaker, and transform the voice command into a computer-readable payment request, encapsulate the payment request, recipient identifier, and sender identifier in a network packet, and transmit the payment request to a payment-service-system server. The payment-service-system server receives the payment request in step 804. In the optional embodiment with authentication, the payment-service-system server can authenticate the user computing device by, for example, using two-factor authentication or verifying the keyword in the payment request. If the payment-service-system server cannot authenticate the user, the process can terminate in step 812. If the user is authenticated, the payment-service-system server can proceed to step 806 to identify user information in the payment request and corresponding payment accounts.

Upon identifying user information, the payment-service-system server can request additional information or confirmation from the first user computing device via a confirmation request in step 808. The request can be via an audible message, or, alternatively as a textual message via a separate device, e.g., another user computing device or over email. The request can be to confirm the recipient and the amount. The request for additional information can include a last name, for example, if there are two possible recipients with the same last name. The user can input a confirmation or additional information in step 809. If, for example, the payment-service-system server requests confirmation that the user intends to send a payment request to "John Smith," the user can respond by stating that the recipient is "John Doe." The user can also respond with a command to stop the transaction, e.g., "terminate payment transaction." The voice-recognition server can receive and process the response from the first user computing device in step 810. The possible responses can be predefined, e.g., "cancel," "different user," or "confirm." Each of these commands can be associated with synonyms that can be found in a thesaurus or preprogrammed into the voice-recognition server. If a user responds with any synonym of these commands, the voice-recognition server can convert the synonym to a command that the payment-service-system server will understand, and send the response to the payment-service-system server in an encapsulated network packet. The payment-service-system server can process the request in step 811. Processing the request can include canceling the transaction in step 812. Alternatively, the payment-service-system server can identify a new command, such as instead of sending a payment request to John Smith, it should go to John Doe, in which case the process can proceed back to step 806 to re-identify user information and request confirmation again. Finally, if the user confirmed the payment transaction, the process can continue to step 812 to generate a notification to the payment request recipient to authorize the payment request.

In step 814, the second user computing device can receive the payment request or payment authorization message via an SMS message, an email, or notification in an application from the payment-service-system server. The user can either decline authorization or authorize the payment request. Upon receiving the user's selection, the process can continue to step 812 to cancel the transaction, or to step 816 to process the payment transaction. Processing the payment transaction can include transferring funds from one account to another, i.e., subtracting funds from a sender account balance associated with the first user computing device adding funds to a recipient account balance associated with the second user computing device, or vice versa. The payment-service-system server can update the account information in local databases, and transmit a transaction to a system of record server in step 818 to record the transaction in a database associated with a bank. In addition to updating the system of record server, the payment-service-system server can send notifications to the first user computing device (step 822) and the second user computing device (step 820) to notify them that the transaction was completed. In alternative embodiments, the notifications in steps 822 and 820 can be sent first to the voice-recognition server, which can then transmit the notifications to the respective user computing devices.

FIG. 8 illustrates the notifications going to the same user computing devices that were used to process the payment request, but they could alternatively be sent to other user computing devices associated with the same users. For example, some voice-controlled speakers might not allow third-party servers to send notifications to or request information from users on the same voice-controlled speakers. Therefore, some embodiments contemplate initiating a payment transaction on a voice-controlled speaker, but completing subsequent steps in the process on a different user computing device, such as a smartphone, but owned by the same user.

By recognizing text and speech the systems and methods described above can add additional functionality to messaging applications, chatbots, voice-controlled speakers, etc. As described above, this additional functionality includes making online payments, accessing online banking information (including past transactions, balance, funds transfer, etc.) The systems can recognize textual conversations and respond in intelligent and useful ways to provide payment and banking services.

Other payment-related features that the system can perform include transmitting financial information, such as account balances, a list of transactions, payment history, or funds transfers between accounts. Each of these operations can be associated with one or more respective keywords to perform the operations. For example, a user can give an instruction, such as "Request that Steve repay me for dinner last night." The payment-service-system server can receive an instruction, and in response, can identify a contact named "Steve" and a transaction associated with payment context of the message, i.e., "dinner last night." The payment-service-system server can query a database for a list of transactions from the evening of the day before, and identify a transaction at a restaurant. The system can also attempt to discriminate between dinner purchases v. drink purchases by looking at an itemized list of purchases. This may be possible given that the payment-service-system server may process the transaction on the merchant side of the transaction, and therefore has an itemized list of items purchase. Once identified, the payment-service-system server can transmit information about the transaction(s) to the voice-recognition server, which can then convert the information into an audible confirmation request for the user to confirm that this is the correct transaction and recipient. Once confirmed, either vie an audible command or an instruction received from a user interface of a mobile device, the payment-service-system server can receive a confirmation of the repayment request. In response, the payment-service-system server can send a repayment request to Steve via, for example, Steve's mobile device, computer, or voice-controlled speaker. Steve can then authorize the repayment request, and the payment-service-system server can complete the transfer of funds per the request. At any time, either party can request that the payment-service-system server cancel the transaction.

The terms "connected" or "coupled" and related terms used throughout the description are used in an operational sense and are not necessarily limited to a direct physical connection or coupling. Thus, for example, two devices may be coupled directly, or via one or more intermediary media or devices. As another example, devices may be coupled in such a way that information can be passed there-between, while not sharing any physical connection with one another. Based on the disclosure provided herein, one of ordinary skill in the art will appreciate a variety of ways in which connection or coupling exists in accordance with the aforementioned definition.

The phrases "in some embodiments," "according to some embodiments," "in the embodiments shown," "in other embodiments," and the like generally mean the particular feature, structure, or characteristic following the phrase is included in at least one implementation of the disclosed technology, and may be included in more than one implementation. In addition, such phrases do not necessarily refer to the same embodiments or different embodiments.

The term "module" or "engine" refers broadly to general or specific-purpose hardware, software, or firmware (or any combination thereof) components. Modules and engines are typically functional components that can generate useful data or other output using specified input(s). A module or engine may or may not be self-contained. Depending upon implementation-specific or other considerations, the modules or engines may be centralized or functionally distributed. An application program (also called an "application") may include one or more modules and/or engines, or a module and/or engine can include one or more application programs.

The term "cause" and variations thereof, as used throughout this description, refers to either direct causation or indirect causation. For example, a computer system can "cause" an action by sending a message to a second computer system that commands, requests or prompts the second computer system to perform the action. Any number of intermediary devices may examine and/or relay the message during this process. In this regard, a device can "cause" an action even though it may not be known to the device whether the action will ultimately be executed or completed.

One or more different inventions may be described in the present application. Further, for one or more of the invention(s) described herein, numerous embodiments may be described in this patent application, and are presented for illustrative purposes only. The described embodiments are not intended to be limiting in any sense. One or more of the invention(s) may be widely applicable to numerous embodiments, as is readily apparent from the disclosure. These embodiments are described in sufficient detail to enable those skilled in the art to practice one or more of the invention(s), and it is to be understood that other embodiments may be utilized and that structural, logical, software, electrical and other changes may be made without departing from the scope of the one or more of the invention(s). Accordingly, those skilled in the art will recognize that the one or more of the invention(s) may be practiced with various modifications and alterations. Particular features of one or more of the invention(s) may be described with reference to one or more particular embodiments or figures that form a part of the present disclosure, and in which are shown, by way of illustration, specific embodiments of one or more of the invention(s). It should be understood, however, that such features are not limited to usage in the one or more particular embodiments or figures with reference to which they are described. The present disclosure is neither a literal description of all embodiments of one or more of the invention(s) nor a listing of features of one or more of the invention(s) that must be present in all embodiments.

Headings of sections provided in this patent application and the title of this patent application are for convenience only, and are not to be taken as limiting the disclosure in any way.

Devices that are in communication with each other need not be in continuous communication with each other, unless expressly specified otherwise. In addition, devices that are in communication with each other may communicate directly or indirectly through one or more intermediaries.

A description of an embodiment with several components in communication with each other does not imply that all such components are required. To the contrary, a variety of optional components are described to illustrate the wide variety of possible embodiments of one or more of the invention(s).

Further, although process steps, method steps, algorithms or the like may be described in a sequential order, such processes, methods and algorithms may be configured to work in alternate orders. In other words, any sequence or order of steps that may be described in this patent application does not, in and of itself, indicate a requirement that the steps be performed in that order. The steps of described processes may be performed in any order practical. Further, some steps may be performed simultaneously despite being described or implied as occurring non-simultaneously (e.g., because one step is described after the other step). Moreover, the illustration of a process by its depiction in a drawing does not imply that the illustrated process is exclusive of other variations and modifications thereto, does not imply that the illustrated process or any of its steps are necessary to one or more of the invention(s), and does not imply that the illustrated process is preferred.

When a single device or article is described, it will be readily apparent that more than one device/article (whether or not they cooperate) may be used in place of a single device/article. Similarly, where more than one device or article is described (whether or not they cooperate), it will be readily apparent that a single device/article may be used in place of the more than one device or article.

The functionality and/or the features of a device may be alternatively embodied by one or more other devices that are not explicitly described as having such functionality/features. Thus, other embodiments of one or more of the invention(s) need not include the device itself.

Techniques and mechanisms described or referenced herein will sometimes be described m singular form for clarity. However, particular embodiments include multiple iterations of a technique or multiple instantiations of a mechanism unless noted otherwise.

Various techniques will now be described in detail with reference to a few example embodiments thereof as illustrated in the accompanying drawings. In the following description, numerous specific details are set forth in order to provide a thorough understanding of one or more aspects and/or features described or reference herein. It will be apparent, however, to one skilled in the art, that one or more aspects and/or features described or reference herein may be practiced without some or all of these specific details. In other instances, well known process steps and/or structures have not been described in detail in order to not obscure some of the aspects and/or features described or reference herein.

Embodiments of the subject matter and the operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, e.g., one or more modules of computer program instructions, encoded on a non-transitory computer storage medium for execution by, or to control the operation of, data processing apparatus. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., multiple CDs, disks, or other storage devices).

The operations described in this specification can be implemented as operations performed by a data processing apparatus on data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language resource), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending resources to and receiving resources from a device that is used by the user; for example, by sending web pages to a web browser on a user's client device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits data (e.g., an HTML page) to a client device (e.g., for purposes of displaying data to and receiving user input from a user interacting with the client device). Data generated at the client device (e.g., a result of the user interaction) can be received from the client device at the server.

A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions.

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Presently preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

We claim:

1. A method comprising:

receiving, by a messaging-service server, from a user computing device of a user, a message generated within a messaging application associated with the messaging-service server and executing on the user computing device, the message including at least a user identifier encoded in message data of the message, the message data being generated as part of a conversation between at least the user of the messaging application and a software agent associated with a payment-service-system server;

determining, by the messaging-service server and based on the message data, that the message includes a syntax;

in response to determining that the message includes the syntax, forwarding, by the messaging-service server, the message to the payment-service-system server;

querying, by the payment-service-system server, a database to determine whether the user identifier is associated with a user account associated with the payment-service-system server;

identifying, based on a determination that the user identifier is associated with the user account, and using the software agent to process the message data, a banking-related action to be performed in association with the user account;

generating, using the software agent, a human-readable textual message that states the banking-related action to be performed;

transmitting, by the payment-service-system server, the human-readable textual message and a confirmation request to the messaging-service server;

forwarding, by the messaging-service server, to the user computing device, the human-readable textual message and the confirmation request for display on the user computing device within the messaging application to confirm the banking-related action, the confirmation request being an interactive prompt presented within the messaging application;

receiving, by the messaging-service server, from the user computing device and in association with an interaction with the interactive prompt, a confirmation to perform the banking-related action; and upon receiving the confirmation, transmitting, by the messaging-service server, an instruction to the payment-service-system server to automatically perform the banking-related action in association with the user account.

2. The method of claim 1, further comprising:

accessing, by the payment-service-system server, histori-cal data associated with the user identifier, the historical data comprising payment history, message history data, user data, and merchant data;

determining, by the payment-service-system server, con-text associated with the conversation; and generating, by the payment-service-system server, based on the historical data and the context, a recommenda-tion including one or more additional actions or reminders for the user.

3. The method of claim 2, wherein the context comprises a date associated with the conversation, a time associated with the conversation, a location associated with the con-versation, the user associated with the conversation, or one or more goods or services associated with the conversation.

4. The method of claim 1, further comprising generating results data based at least in part on processing performed, by the software agent, on the message data, wherein iden-tifying the banking-related action is based at least in part on the results data.

5. The method of claim 1, wherein the message comprises one of a voice command or an instant message.

6. The method of claim 1, wherein the confirmation comprises one of a voice command requesting the banking-related action or an instant message requesting the banking-related action.

7. The method of claim 1, wherein performing the bank-ing-related action comprises one or more of (i) initiating a transfer of funds between one or more financial accounts associated with the user identifier, (ii) initiating the transfer of the funds from a first financial account associated with the user identifier to a second financial account associated with a second user, (iii) canceling the transfer of the funds, (iv) accessing banking information associated with the one or more financial accounts associated with the user identifier, or (v) initiating an online payment associated with the user identifier.

8. The method of claim 1, wherein the software agent corresponds to a chatbot.

9. A payment-service-system server comprising:

one or more processors; and one or more non-transitory computer-readable media stor-ing instructions executable by the one or more proces-sors, wherein the instructions program the one or more processors to perform operations comprising:

receiving, from a messaging-service server, a message generated within a messaging application associated with the messaging-service server and executing on a user computing device, the message including at least a user identifier encoded in message data of the message;

querying a database to determine whether the user identifier is associated with a user account associated with the payment-service-system server;

identifying, using natural language processing, a cur-rency indicator or a payment word in the message;

in response to identifying the currency indicator or the payment word in the message, determining, using a software agent associated with the payment-service-system server to process the message data, a bank-ing-related action to be performed in association with the user account;

generating, using the software agent, a human-readable textual message that states the banking-related action to be performed;

transmitting, to the messaging-service server, the human-readable textual message and a confirmation request for display on the user computing device within the messaging application to confirm the banking-related action; and upon the messaging-service server receiving, from the user computing device and in association with an interaction with the messaging application, a confir-mation to perform the banking-related action, receiv-ing, from the messaging-service server, an instruc-tion to automatically perform the banking-related action in association with the user account.

10. The payment-service-system server of claim 9, wherein the message data is generated as part of a conver-sation between at least a user of the messaging application and the software agent.

11. The payment-service-system server of claim 10, the operations further comprising:

accessing historical data associated with the user identi-fier, the historical data comprising payment history, message history data, user data, and merchant data;

determining context associated with the conversation;

generating based on the historical data and the context, a recommendation including one or more additional actions or reminders for the user; and transmitting the recommendation to the messaging-ser-vice server for display on the user computing device within the messaging application.

12. The payment-service-system server of claim 9, wherein the software agent corresponds to a chatbot.

13. The payment-service-system server of claim 9, wherein the confirmation request comprises an interactive prompt presented within the messaging application and wherein the confirmation is received as a response to the interactive prompt.

14. The payment-service-system server of claim 9, the operations further comprising generating results data based at least in part on processing performed by the software agent on the message data, wherein determining the bank-ing-related action is based at least in part on the results data.

15. The payment-service-system server of claim 9, wherein the message comprises one of a voice command or an instant message.

16. The payment-service-system server of claim 9, wherein the confirmation comprises one of a voice com-mand requesting the banking-related action or an instant message requesting the banking-related action.

17. The payment-service-system server of claim 9, wherein performing the banking-related action comprises one or more of (i) initiating a transfer of funds between one or more financial accounts associated with the user identi-fier, (ii) initiating the transfer of the funds from a first financial account associated with the user identifier to a second financial account associated with a second user, (iii) canceling the transfer of the funds, (iv) accessing banking information associated with the one or more financial accounts associated with the user identifier, or (v) initiating an online payment associated with the user identifier.

18. One or more non-transitory computer-readable media maintaining instructions that, when executed by one or more processors of a payment-service-system server, program the one or more processors to perform operations comprising:

receiving, from a messaging-service server, a message generated within a messaging application associated with the messaging-service server and executing on a user computing device, the message including at least a user identifier encoded in message data of the message;

querying a database to determine whether the user identifier is associated with a user account associated with the payment-service-system server;

identifying, using natural language processing, a currency indicator or a payment word in the message;

in response to identifying the currency indicator or the payment word in the message, determining, using a software agent associated with the payment-service-system server to process the message data, a banking-related action to be performed in association with the user account;

generating, using the software agent, a human-readable textual message that states the banking-related action to be performed;

transmitting, to the messaging-service server, the human-readable textual message and a confirmation request for display on the user computing device within the messaging application to confirm the banking-related action; and upon the messaging-service server receiving, from the user computing device and in association with an interaction with the messaging application, a confirmation to perform the banking-related action, receiving, from the messaging-service server, an instruction to automatically perform the banking-related action in association with the user account.

19. The one or more non-transitory computer-readable media of claim 18, wherein:

the message data is generated as part of a conversation between at least a user of the messaging application and the software agent;

the confirmation request comprises an interactive prompt presented within the messaging application; and the confirmation is received as a response to the interactive prompt.

20. The one or more non-transitory computer-readable media of claim 19, the operations further comprising:

accessing historical data associated with the user identifier, the historical data comprising payment history, message history data, user data, and merchant data;

determining context associated with the conversation; and generating, based on the historical data and the context, a recommendation including one or more additional actions or reminders for the user.

* * * * *